United States Patent
Bahl et al.

(10) Patent No.: US 10,223,604 B2
(45) Date of Patent: Mar. 5, 2019

(54) LIVE VIDEO ANALYTICS AT SCALE

(71) Applicant: Microsoft Technology Licensing, LLC, Redmond, WA (US)

(72) Inventors: Paramvir Bahl, Bellevue, WA (US); Peter Bodik, Kirkland, WA (US); Matthai Philipose, Seattle, WA (US); Ganesh Ananthanarayanan, Seattle, WA (US); Haoyu Zhang, Princeton, NJ (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 169 days.

(21) Appl. No.: 15/373,301

(22) Filed: Dec. 8, 2016

(65) Prior Publication Data

US 2018/0129892 A1 May 10, 2018

Related U.S. Application Data

(60) Provisional application No. 62/418,233, filed on Nov. 6, 2016.

(51) Int. Cl.
*G06K 9/00* (2006.01)
*G06F 9/48* (2006.01)
(Continued)

(52) U.S. Cl.
CPC ....... *G06K 9/00979* (2013.01); *G06F 9/4881* (2013.01); *G06F 9/50* (2013.01);
(Continued)

(58) Field of Classification Search
CPC ........... G06K 9/00711; G06K 9/00771; G06K 9/00979; G06F 9/4806; G06F 9/4881; G06F 9/50; H04N 7/181; H04N 21/23418
See application file for complete search history.

(56) References Cited

U.S. PATENT DOCUMENTS 6,711,616 B1   3/2004   Stamm et al. ............... 709/226
7,185,003 B2   2/2007   Bayliss et al. .................. 707/3
(Continued)

FOREIGN PATENT DOCUMENTS

CN    105355068 A    2/2016
WO    2016028143 A1  2/2016
WO    2016145919 A1  9/2016

OTHER PUBLICATIONS

Wei, et al., "Prediction-Based QoS Management for Real-Time Data Streams", In Proceedings of 27th IEEE International Real-Time Systems Symposium, Dec. 5, 2006, 12 pages.
(Continued)

*Primary Examiner* — Andrew W Johns
(74) *Attorney, Agent, or Firm* — Medley, Behrens & Lewis, LLC

(57) ABSTRACT

Various technologies described herein pertain to performing video analytics. The approaches set forth herein support live video analytics at scale with approximate and delay-tolerant processing. Video streams can be captured by multiple cameras and continuously streamed to a video analytics computing system; the video streams can be received at the video analytics computing system. Multiple video analytics queries can be executed on the video streams. The multiple video analytics queries can be concurrently executed by the video analytics computing system on the video streams as the video streams are continuously streamed to the video analytics computing system. The multiple video analytics queries can be executed utilizing resources of the video analytics computing system allocated between the multiple video analytics queries. Execution of the multiple video analytics queries can return respective results for the multiple video analytics queries. The results for the multiple video analytics queries can be outputted.

20 Claims, 10 Drawing Sheets

(51) Int. Cl.
*G06F 9/50* (2006.01)
*H04N 7/18* (2006.01)
*H04N 21/234* (2011.01)

(52) U.S. Cl.
CPC ...... *G06K 9/00711* (2013.01); *G06K 9/00771* (2013.01); *H04N 7/181* (2013.01); *H04N 21/23418* (2013.01); *G06K 2009/00738* (2013.01)

(56) References Cited

U.S. PATENT DOCUMENTS

| | | |
|---|---|---|
| 8,752,112 B2 | 6/2014 | Krasic et al. ............... 725/116 |
| 8,934,670 B2 | 1/2015 | Feris et al. ............ G06T 7/2053 |
| 9,407,944 B1 | 8/2016 | Galdy et al. ........ H04N 21/2385 |
| 2002/0032697 A1 | 3/2002 | French et al. ............. 707/500.1 |
| 2002/0152305 A1 | 10/2002 | Jackson et al. ............. 709/224 |
| 2005/0066331 A1 | 3/2005 | Inoue et al. ................. 718/104 |
| 2006/0062430 A1* | 3/2006 | Vallone et al. .... G06K 9/00711 382/103 |
| 2010/0040341 A1 | 2/2010 | Yeh, Jr. ....................... 386/52 |
| 2012/0179742 A1 | 7/2012 | Acharya et al. ............. 709/202 |
| 2014/0085501 A1 | 3/2014 | Tran .................. H04N 5/23229 |
| 2015/0215583 A1 | 7/2015 | Chang ................... H04N 7/181 |
| 2016/0275642 A1* | 9/2016 | Abeykoon et al. ....... G06T 1/20 |

OTHER PUBLICATIONS

Zaharia, et al., "Discretized Streams: Fault-Tolerant Streaming Computation at Scale", In Proceedings of the Twenty-Fourth ACM Symposium on Operating Systems Principles, Nov. 3, 2013, 16 pages.
"International Search Report and Written Opinion Issued in PCT Application No. PCT/US2017/059135", dated Dec. 21, 2017, 13 Pages.
Lu, et al., "VisFlow: A Relational Platform for Efficient Large-Scale Video Analytics", In TechReport MSR-TR-2016-13, Jun. 2016, pp. 1-14.
Hacker, et al., "An Instructional Cloud-Based Testbed for Image and Video Analytics", In Proceedings of IEEE 6th International Conference on Cloud Computing Technology and Science, Dec. 15, 2014, 4 pages.
Fu, et al., "DRS: Dynamic Resource Scheduling for Real-Time Analytics over Fast Streams", In Journal of Computing Research Repository, Jan. 2015, 12 pages.
Zhou, et al., "Quality-Delay Tradeoff for Video Streaming over Mobile Ad Hoc Networks", In Proceedings of IEEE International Conference on Communications, Jun. 10, 2012, pp. 223-227.
Rodríguez-Silva, et al., "Video surveillance based on cloud storage", In Proceedings of IEEE 5th International Conference on Cloud Computing, Jun. 24, 2012, pp. 991-992.
"Using the IBM Intelligent Video Analytics operator client", Retrieved on: Sep. 7, 2016, Available at: <<https://www.ibm.com/support/knowledgecenter/SS88XH_1.6.1/iva/use_intro.html>>, 1 page.
"Apache Flink", Retrieved on: Sep. 15, 2016, Available at: <<https://flink.apache.org/>>, 2 pages.
"Apache Storm", Retrieved on: Sep. 15, 2016, Available at: <<https://storm.apache.org/>>, 3 pages.
"Virtual Machines Pricing", Retrieved on: Sep. 15, 2016, Available at: <<https://azure.microsoft.com/en-us/pricing/details/virtual-machines/>>, 5 pages.
"Hadoop MapReduce Next Generation—Capacity Schedule", Retrieved on: Sep. 15, 2016, Available at: <<https://hadoop.apache.org/docs/r2.4.1/hadoop-yarn/hadoop-yarn-site/CapacityScheduler.html>>, 3 pages.
"Hadoop MapReduce Next Generation—Fair Scheduler", Retrieved on: Sep. 15, 2016, Available at: <<https://hadoop.apache.org/docs/r2.4.1/hadoop-yarn/hadoop-yarn-site/FairScheduler.html>>, 3 pages.

Borthakur, Dhruba, "HDFS Architecture Guide", Retrieved on: Sep. 15, 2016, Available at: <<http://hadoop.apache.org/docs/r1.2.1/hdfs_design.html>>, 7 pages.
"Job Objects", Retrieved on: Sep. 15, 2016, Available at: <<https://msdn.microsoft.com/en-us/library/windows/desktop/ms684161(v=vs. 85).aspx>>, 2 pages.
"Microsoft Cognitive Services", Retrieved on: Sep. 15, 2016, Available at: <<https://www. microsoft.com/cognitive-services/.>>, 3 pages.
"Open ALPR", Retrieved on: Sep. 15, 2016, Available at: <<http://www.openalpr.com>>, 4 pages.
"Tesseract-Ocr", Retrieved on: Sep. 15, 2016, Available at: <<https://github.com/tesseract-ocr>>, 1 page.
Abadi, et al., "The Design of the Borealis Stream Processing Engine", In Proceedings of the CIDR Conference, Jan. 2005, 13 pages.
Akidau, et al., "The dataflow model: A practical approach to balancing correctness, latency, and cost in massive-scale, unbounded, out-of-order data processing", In Proceedings of the VLDB Endowment, vol. 8, Issue 12, Aug. 2015, pp. 1792-1803.
"Apdache Hadoop YARN", Retrieved on: Sep. 15, 2016, Available at: <<http://hadoop.apache.org/docs/current/hadoop-yarn/hadoop-yarn-site/YARN.html>>, 1 page.
Auyoung, et al., "Evaluating the impact of inaccurate information in utility-based scheduling", In Proceedings of the Conference on High Performance Computing Networking, Storage and Analysis, Nov. 14, 2009, 12 pages.
Babcock, et al., "Load shedding for aggregation queries over data streams", In Proceedings of the 20th International Conference on Data Engineering, Mar. 30, 2004, pp. 1-12.
Beloglazov, et al., "Energy efficient resource management in virtualized cloud data centers", In Proceedings of the 10th IEEE/ACM international conference on cluster, cloud and grid computing, May 17, 2010, pp. 826-831.
Bhattacharya, et al., "Hierarchical scheduling for diverse data center workloads", In Proceedings of the 4th annual Symposium on Cloud Computing, Oct. 1, 2013, 15 pages.
Bobroff, et al., "Dynamic placement of virtual machines for managing sla violations", In Proceedings of 10th IFIP/IEEE International Symposium on Integrated Network Management, May 21, 2007, pp. 119-128.
Boutin, et al., "Apollo: Scalable and Coordinated Scheduling for Cloud-Scale Computing", In Proceedings of 11th USENIX Symposium on Operating Systems Design and Implementation, Oct. 6, 2014, pp. 285-300.
Carney, et al., "Monitoring streams: a new class of data management applications", In Proceedings of the 28th International conference on Very Large Data Bases, Aug. 20, 2002, 12 pages.
Cherniack et al., "Scalable Distributed Stream Processing", In Proceedings of First Biennial Conference on Innovative Data Systems Research, Jan. 5, 2003, 12 pages.
Curino, et al., "Reservation-based Scheduling: If You're Late Don't Blame Us!", In Proceedings of the ACM Symposium on Cloud Computing, Nov. 3, 2014, 14 pages.
Dantzig, George B, "Discrete-Variable Extremum Problems", In Operations Research, vol. 5, Issue 2, Apr. 1957, pp. 266-289.
Ferguson, et al., "Jockey: Guaranteed Job Latency in Data Parallel Clusters", In Proceedings of the 7th ACM european conference on Computer Systems, Apr. 10, 2012, pp. 99-112.
Ghodsi, et al., "Dominant resource fairness: Fair allocation of multiple resource types", In Proceedings of the 8th USENIX conference on Networked systems design and implementation, Mar. 30, 2011, pp. 1-14.
Grandl, et al., "Multi-Resource Packing for Cluster Schedulers", In Proceedings of the ACM conference on SIGCOMM, Aug. 17, 2014, pp. 455-466.
Hindman, et al., "Mesos: A platform for fine-grained resource sharing in the data center", In Proceedings of the 8th USENIX conference on Networked systems design and implementation, Mar. 30, 2011, pp. 1-14.
Jaffe, Jeffrey M., "Bottleneck flow control", In Journal of IEEE Transactions on Communications, vol. 29, Issue 7, Jul. 1981, pp. 954-962.

(56) References Cited

OTHER PUBLICATIONS

Lin, et al., "StreamScope: Continuous Reliable Distributed Processing of Big Data Streams", In Proceedings of the 13th USENIX Symposium on Networked Systems Design and Implementation, Mar. 16, 2016, pp. 439-453.

Minarolli, et al., "Utility-based resource allocation for virtual machines in cloud computing", In Proceedings of IEEE Symposium on Computers and Communications, Jun. 28, 2011, 8 pages.

Moraria, et al., "Model predictive control: past, present and future", In Journal of Computers & Chemical Engineering, vol. 23, Issues 4-5, May 1, 1999, pp. 667-682.

Motwani, et al., "Query Processing, Resource Management, and Approximation in a Data Stream Management System", In Proceedings First Biennial Conference on Innovative Data Systems Research, Jan. 5, 2003, 12 pages.

Padala, et al., "Adaptive control of virtualized resources in utility computing environments", In Journal of ACM SIGOPS Operating Systems Review, vol. 41, Issue 3, Mar. 21, 2007, pp. 289-302.

Panigrahy, et al., "Heuristics for vector bin packing", In Technical Report of MSR-TR-2011, Jan. 1, 2011, 14 pages.

Rabkin, et al., "Aggregation and degradation in JetStream: streaming analytics in the wide area", In Proceedings of the 11th USENIX Conference on Networked Systems Design and Implementation, Apr. 2, 2014, pp. 275-288.

Steinder, et al., "Server virtualization in autonomic management of heterogeneous workloads", In Proceedings of 10th IFIP/IEEE International Symposium on Integrated Network Management, May 21, 2007, pp. 139-148.

Tatbul, et al., "Efficient load shedding techniques for distributed stream processing", In Proceedings of the 33rd international conference on Very large data bases, Sep. 23, 2007, pp. 159-170.

Tatbul, et al., "Load shedding in a data stream manager", In Proceedings of the 29th international conference on Very large data bases, vol. 29, Sep. 9, 2003, 12 pages.

Tu, et al., "Control-based quality adaptation in data stream management systems", In Proceedings of 16th International Conference on Database and Expert Systems Applications, Aug. 22, 2005, pp. 746-755.

Tu, et al., "Load shedding in stream databases: a control-based approach", In Proceedings of the 32nd international conference on Very large data bases, Sep. 12, 2006, pp. 787-798.

Rijsbergen, C. J. Van, "Information Retrieval", In Journal of the Association for Information Science and Technology, vol. 30, Issue 6, Nov. 1979, 153 pages.

Vazirani, Vijay V., "Approximation algorithms", In Publication of Springer-Verlag, May 2001, 396 pages.

Venkataraman, et al., "The Power of Choice in Data-Aware Cluster Scheduling", In Proceedings of the 11th USENIX conference on Operating Systems Design and Implementation, Oct. 6, 2014, pp. 1-16.

Verma, et al., "Large-scale cluster management at Google with Borg", In Proceedings of the Tenth European Conference on Computer Systems, Apr. 21, 2015, 18 pages.

\* cited by examiner

LIVE VIDEO ANALYTICS AT SCALE

CROSS-REFERENCE TO RELATED APPLICATION

This application claims priority to U.S. Provisional Patent Application No. 62/418,233, filed on Nov. 6, 2016, and entitled "LIVE VIDEO ANALYTICS AT SCALE", the entirety of which is incorporated herein by reference.

BACKGROUND

Video cameras are pervasively deployed in society; for instance, it is common for millions of cameras to be deployed in a city. Cameras can be deployed for any number of purposes. For example, some cameras can be installed in or on buildings for surveillance and business intelligence. Other cameras can be deployed to capture video of outdoor scenes (e.g., streets) for traffic control and crime prevention.

Organizations can deploy large numbers of cameras. According to an illustration, a police department can deploy a significant number of cameras at various locations in a city. Conventionally, video streams from these cameras can be recorded, and if an incident were to occur, the recorded video streams can be reviewed. For instance, if a traffic accident were to occur, then recorded video streams from cameras that may have captured the traffic accident can be analyzed in an attempt to find relevant portions of the recorded video streams.

Traditionally, the recorded video streams were oftentimes manually reviewed; however, manual review of recorded video streams becomes increasingly more difficult as the number of cameras continues to increase. More recently, some approaches perform video analytics on the video streams ingested from the cameras. Yet, video analytics can have significant resource demands. For instance, to track objects in video, some techniques can process 1 frame per second (or less) on an 8-core machine. Pursuant to another example, techniques that use Deep Neural Networks for object recognition can employ on the order of 30 GFlops to process a single frame. Due to the high processing costs and high data rates of video streams, quality of results returned and lag in time for returning the results for conventional video analytics approaches can be detrimentally impacted.

SUMMARY

Described herein are various technologies that pertain to performing video analytics. The approaches set forth herein support live video analytics at scale with approximate and delay-tolerant processing. Video streams can be captured by multiple cameras and continuously streamed to a video analytics computing system; thus, the video streams can be received at the video analytics computing system. Multiple video analytics queries can be executed on the video streams. The multiple video analytics queries can be concurrently executed by the video analytics computing system on the video streams as the video streams are continuously streamed to the video analytics computing system. The multiple video analytics queries can be executed utilizing resources (e.g., processor, memory) of the video analytics computing system allocated between the multiple video analytics queries. Execution of the multiple video analytics queries can return respective results for the multiple video analytics queries. Further, the results for the multiple video analytics queries can be outputted.

According to various embodiments, the video analytics computing system can schedule the multiple video analytics queries. Scheduling of the multiple video analytics queries can be jointly based on resource-quality profiles of the multiple video analytics queries and lag tolerances of the multiple video analytics queries. A resource-quality profile of a video analytics query can specify resource demands and result qualities corresponding to candidate multi-dimensional configurations of the video analytics query. Scheduling of the multiple video analytics queries can include allocating the resources of the video analytics computing system between the multiple video analytics queries for the execution of each of the multiple video analytics queries. Further, scheduling of the multiple video analytics queries can include selecting multi-dimensional configurations for each of the multiple video analytics queries based on the resources as allocated. Scheduling of the multiple video analytics queries can also include placing the multiple video analytics queries on worker computing devices (e.g., particular machines) of the video analytics computing system for the execution of the multiple video analytics queries.

Further, in accordance with various embodiments, resource-quality profiles of the multiple video analytics queries can be generated. For example, responsive to receiving a particular video analytics query (e.g., at the video analytics computing system), a resource-quality profile of the particular video analytics query can be generated. The resource-quality profile can specify resource demands and result qualities corresponding to candidate multi-dimensional configurations of the particular video analytics query. For instance, the resource-quality profile of the particular video analytics query can be generated by identifying the candidate multi-dimensional configurations utilizing a greedy local search in a resource-quality space, such that the candidate multi-dimensional configurations can be a subset of potential multi-dimensional configurations on a Pareto boundary.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
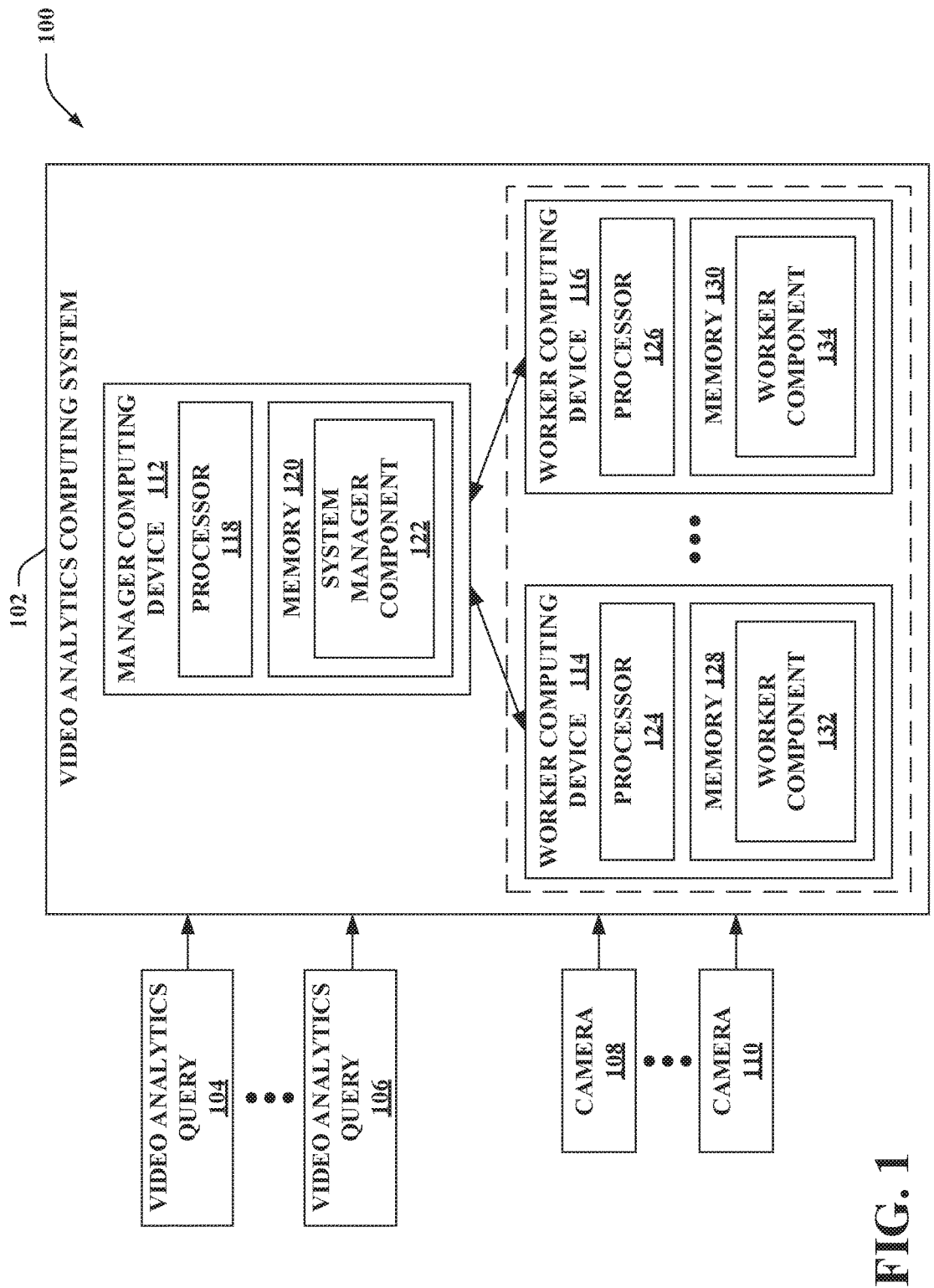
FIG. 1 illustrates a functional block diagram of an exemplary system that performs video analytics.

Various technologies pertaining to performing live video analytics at scale with approximate and delay-tolerant processing are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that performs video analytics. The system 100 includes a video analytics computing system 102 that processes video analytics queries on video streams from a plurality of cameras. The video analytics computing system 102 can process a video analytics query 104, . . . , and a video analytics query 106 (collectively referred to herein as video analytics queries 104-106). It is contemplated that the video analytics computing system 102 can process substantially any number of video analytics queries 104-106. Moreover, the video streams upon which the video analytics queries 104-106 are processed can be from a camera 108, . . . , and a camera 110 (collectively referred to herein as cameras 108-110). Accordingly, the cameras 108-110 are communicatively coupled (e.g., indirectly or directly, via wireless and/or wired connections) with the video analytics computing system 102, thereby enabling the video streams to be sent to the video analytics computing system 102.

The video analytics computing system 102 supports live video analytics at scale with approximate and delay-tolerant processing. The video analytics computing system 102 can control result qualities of the video analytics queries 104-106; a result quality for a video analytics query can be an accuracy of a result returned responsive to the video analytics query relative to an actual value (e.g., a degree to which the actual value is approximated). For instance, for a video analytics query for counting cars in a video stream, the quality of a result generated responsive to the video analytics query can be based on how accurate the result is compared to the actual value (e.g., accuracy of the car count outputted responsive to the car counting query performed on the video stream relative to an actual car count in the video stream). Moreover, the video analytics queries 104-106 can have various lag tolerances; for instance, the video analytics queries 104-106 can be processed such that production of results of at least some of the video analytics queries 104-106 by the video analytics computing system 102 are delayed in time.

The video analytics computing system 102 can be or include one or more server computing devices (e.g., the video analytics computing system 102 can be or include a cluster of server computing devices). For instance, the video analytics computing system 102 can be or include one or more data centers, where a data center includes a plurality of server computing devices. One or more data centers can alternatively include the video analytics computing system 102. Further, the video analytics computing system 102 can be a distributed computing system.

More particularly, the video analytics computing system 102 can include a plurality of computing devices. As depicted in FIG. 1, the video analytics computing system 102 includes a manager computing device 112 and a plurality of worker computing devices, namely, a worker computing device 114, . . . , and a worker computing device 116 (collectively referred to herein as worker computing devices 114-116). For example, the video analytics computing system 102 can include 100 worker computing devices 114-116; however, it is to be appreciated that fewer than 100 or more than 100 worker computing devices 114-116 can be included in the video analytics computing system 102. The manager computing device 112 can centrally manage the video analytics computing system 102; as described in greater detail herein, for instance, the manager computing device 112 can control the worker computing devices 114-116. Although not shown, it is to be appreciated that the video analytics computing system 102 can include more than one manager computing device (e.g., a first manager computing device can generate profiles and a second manager computing device can perform scheduling as described herein). Moreover, the worker computing devices 114-116 can execute the video analytics queries 104-106.

Video streams can be captured by the multiple cameras 108-110 and continuously streamed to the video analytics computing system 102. The video analytics computing system 102 can receive the video streams from the cameras 108-110. Moreover, the video analytics computing system 102 can execute the multiple video analytics queries 104-106 on the video streams. The multiple video analytics queries 104-106 can be concurrently executed by the video analytics computing system 102 on the video streams as the video streams are continuously streamed to the video analytics computing system 102. The multiple video analytics queries 104-106 can be executed utilizing resources of the video analytics computing system 102 allocated between the multiple video analytics queries 104-106. Moreover, execution of the multiple video analytics queries 104-106 can return respective results for the multiple video analytics queries 104-106. The video analytics computing system 102 can further output the results for the multiple video analytics queries 104-106.

For example, when outputted by the video analytics computing system 102, the results can be retained in a log (e.g., in a data repository), transmitted from the video analytics computing system 102 to differing computing device(s) and/or differing computing system(s), or displayed on a display screen; however, it is contemplated that any other type of output is intended to fall within the scope of the hereto appended claims (e.g., audio, visual, or haptic feedback can be provided). According to an illustration, a notification can be generated to output a result of a video analytics query (e.g., the notification can specify a location at which a license plate is found responsive to execution of a video analytics query that attempts to locate the license plate, the notification can be transmitted to one or more differing computing devices for presentation). Pursuant to another illustration, a result of a video analytics query (e.g., data specifying license plates on cars detected to pass through a toll booth) can be sent to a differing computing system (e.g., an invoicing system).

The manager computing device 112 includes at least one processor 118 and memory 120. The processor 118 is configured to execute instructions loaded into the memory 120 (e.g., one or more systems loaded into the memory 120, one or more components loaded into the memory 120). As described in greater detail herein, the memory 120 includes a system manager component 122 that can be configured to manage resources of the worker computing devices 114-116 for processing the video analytics queries 104-106.

The worker computing devices 114-116 also each include at least one processor and memory. Thus, the worker computing device 114 includes at least one processor 124, . . . , and the worker computing device 116 includes at least one processor 126 (collectively referred to as processors 124-126). Further, the worker computing device 114 includes memory 128, . . . , and the worker computing device 116 includes memory 130 (collectively referred to as memories 128-130). Again, the processors 124-126 of the worker computing devices 114-116 can each be configured to execute instructions loaded into the respective memories 128-130. Moreover, worker components can be loaded into the memories 128-130, and executed by the processors 124-126; accordingly, the memory 128 of the worker computing device 114 includes a worker component 132, . . . , and the memory 130 of the worker computing device 116 includes the worker component 134 (collectively referred to as worker components 132-134). The worker components 132-134 execute the video analytics queries 104-106 utilizing resources (e.g., the processors 124-126, the memories 128-130) of the worker computing devices 114-116.

A video analytics query (e.g., each of the video analytics queries 104-106) can be specified as a graph of transforms applied to at least one of the video streams. For example, each of the video analytics queries 104-106 can be a directed acyclic graph (DAG) of transforms on live video that is continuously streamed to the video analytics computing system 102. Each of the transforms can process video frames (e.g., a time-ordered stream of messages) in the video stream and can pass corresponding outputs downstream. Thus, a video frame can be sequentially processed by the transforms such that corresponding outputs of the transforms are passed downstream. The worker components 132-134 of the worker computing devices 114-116 perform the transforms as controlled by the system manager component 122 of the manager computing device 112. Moreover, the worker component 132-134 provide feedback to the system manager component 122.

The video analytics computing system 102 supports large scale analytics of live video, which allows the video analytics queries 104-106 to be submitted with arbitrary vision processors. The system manager component 122 of the manager computing device 112 can identify resource-quality profiles of the video analytics queries 104-106; for instance, the resource-quality profiles can be generated without exhaustively exploring a combinatorial space of knob configurations. Moreover, the system manager component 122 can schedule the video analytics queries 104-106 jointly based on the resource-quality profiles and lag tolerances of the video analytics queries 104-106. The system manager component 122 can further schedule the video analytics queries 104-106 based on tradeoffs between resource usage, quality, and lag across the multiple video analytics queries 104-106.

The system manager component 122 can allocate resources of the worker computing devices 114-116 for processing a relatively large number the video analytics queries 104-106, with such allocation being effectuated in a relatively short duration of time. According to an example, the system manager component 122 can allocate resources for thousands of video analytics queries 104-106 in hundreds of milliseconds; yet, the claimed subject matter is not so limited. Moreover, the techniques set forth herein can enable utilizing less CPU resources as compared to conventional approaches to generate profiles of queries. Further, the techniques described herein can enable providing results for the video analytics queries 104-106 with enhanced quality as compared to conventional techniques (e.g., traditional fairness-based scheduling approaches).

The system manager component 122 can generate query resource-quality profiles and allocate resources to the video analytics queries 104-106 to maximize performance on quality and lag; in contrast, various conventional approaches use fair sharing of resources in clusters. The system manager component 122 can consider resource-quality tradeoffs with multi-dimensional configurations and variety in quality and lag goals for the video analytics queries 104-106 when managing resources of the video analytics computing system 102. Resource management provided by the system manager component 122 can be beneficial due to high costs of vision processing. By employing the techniques described herein, the video analytics computing system 102 can support processing thousands of video analytics queries 104-106 on live video streams; however, the claimed subject matter is so limited, as more or less video analytics queries 104-106 can be processed. In view of the foregoing, the output of multiple cameras 108-110 can be efficiently analyzed in real-time.

As noted above, the system manager component 122 of the manager computing device 112 can manage resources of the video analytics computing system 102 for processing the video analytics queries 104-106 based on resource-quality tradeoffs with multi-dimensional configurations. Vision algorithms typically include various parameters, also referred to herein as knobs. Examples of knobs are video resolution, frame rate, and internal algorithmic parameters, such as a size of a sliding window to search for objects in object detectors. A combination of knob values is referred to herein as a configuration of a video analytics query. The configuration space grows exponentially with the number of knobs.

Resource demand can be reduced by changing configurations (e.g., changing a video resolution and sliding window size), but such changes typically lower output quality. Some conventional approaches support changing a single knob value, namely, sampling rate; employing a single knob, however, allows these conventional approaches to use established analytical models to calculate quality and resource demand for different sampling rates. In contrast, the video analytics queries 104-106 described herein are more complex black-boxes with more than one knob; thus, the video analytics queries 104-106 do not have known models to calculate the quality and resource demand. Rather, the system manager component 122 can generate the resource-quality profiles of the video analytics queries 104-106.

Moreover, the system manager component 122 of the manager computing device 112 can manage resources of the video analytics computing system 102 based on variety in quality and lag goals for the video analytics queries 104-106. While some of the video analytics queries 104-106 may require producing results in real-time, other video analytics queries 104-106 can tolerate lag of various durations (e.g., some queries can allow for lags of many minutes). Accordingly, some resources can be temporarily reallocated from lag tolerant video analytics queries during an interim shortage of resources. The shortage of resources can be due to a burst of new video analytics queries or spikes in resource usage of existing video analytics queries (e.g., due to an increase in a number of cars to track on a road).

The video analytics queries 104-106 can have a wide variety of quality and lag goals. For example, a particular video analytics query for counting cars to control traffic lights can work with moderate quality (e.g., approximate car counts) while providing results with relatively low lag. License plate readers at toll routes, in contrast, can require relatively high quality (e.g., accuracy to properly recognize characters on the license plates) while tolerating higher lag (e.g., lag of many minutes can be permitted because billing can be delayed). According to another example, license plate readers used for Amber Alerts can require high quality results without lag.

Scheduling the streaming video analytics queries 104-106 with diverse quality and lag goals, each with many configurations, can be computationally complex. Various conventional systems for stream processing typically allocate resources among multiple queries only based on resource fairness. While simple, such allocation based on resource fairness can be agnostic to query quality and lag, which can detrimentally impact performance of such traditional approaches. In contrast, the video analytics computing system 102 can scale to processing thousands of live video streams from the cameras 108-110 over large clusters. As noted above, the system manager component 122 of the manager computing device 112 can efficiently generate resource-quality profiles for the video analytics queries 104-106 for different knob configurations of such queries. Moreover, the system manager component 122 can jointly maximize the quality and minimize the lag of the streaming video analytics queries 104-106. In doing so, the system manager component 122 can use the generated resource-quality profiles as well as lag and quality goals. The system manager component 122 can allocate resources to each of the video analytics queries 104-106 and can select configurations for such queries based on the allocation (e.g., knob values for the video analytics queries 104-106 can be chosen).

Scheduling for performance can lead to queries achieving better quality and lag. Accordingly, the system manager component 122 of the manager computing device 112 can schedule the video analytics queries 104-106, such that more resources can be allocated to queries whose qualities can have more improvement. The system manager component 122 can also schedule the video analytics queries 104-106 to allow queries with built-up lag in the processing to catch up. Moreover, the system manager component 122 can adjust query configuration based on the resources allocated.

The video analytics component system 102 can address the following challenges. There may not be analytical models for resource demand and quality for a query configuration, and the number of configurations for a query can make it expensive in terms of computing resources, time, and so forth to compute or estimate a resource-quality profile. Moreover, expressing quality and lag goals of individual video analytics queries 104-106 and across the set of video analytics queries 104-106 performed in the video analytics computing system 102 is non-trivial. Further, selecting allocations and configurations can be computationally difficult (e.g., exponential in the number of video analytics queries 104-106 and knobs).

To address the multitude of knobs in the video analytics queries 104-106, the system manager component 122 can separately perform profiling and scheduling. According to an example, the profiling can be performed in an offline phase and the scheduling can be performed in an online phase. Following this example, in the offline phase, the system manager component 122 can generate the resource-quality profiles of the video analytics queries 104-106 without exploring the entire combinatorial space of configurations. Rather, greedy search and domain-specific sampling can be used to identify candidate multi-dimensional configurations on the Pareto boundary of a resource-quality profile for a video analytics query. Thus, during the online phase, the system manager component 122 can consider the candidate multi-dimensional configurations on the Pareto boundary (as opposed to a larger set that includes other multi-dimensional configurations). The Pareto boundary can lack multi-dimensional configurations that are worse in both quality and resource demand compared to other multi-dimensional configurations.

Moreover, quality and lag goals of a video analytics query can be encoded in a utility function. Utility of a video analytics query can be based on achieved result quality and lag; thus, utility can be a weighted combination of the achieved quality and lag, with penalties for violating the goals. Penalties can allow for expressing priorities between the video analytics queries 104-106. Given utilities of multiple video analytics queries 104-106, the system manager component 122 can schedule the video analytics queries 104-106 based on a scheduling objective for the video analytics computing system 102. Example scheduling objectives include maximizing a minimum utility (which can promote fairness) and maximizing a total utility (which can promote performance); however, other scheduling objectives are intended to fall within the scope of the hereto appended claims.

Scheduling can be modeled by the system manager component 122 using Model-Predictive Control (MPC) to predict a future query lag over a time horizon; the predicted lag can be used in the utility function. Scheduling can be performed based on the resource-quality profiles of the video analytics queries 104-106 during allocation, and can allow for lagging queries to catch up. Further, inaccuracies in resource usages in the resource-quality profiles of the video analytics queries 104-106 can be handled.

Figure 2:
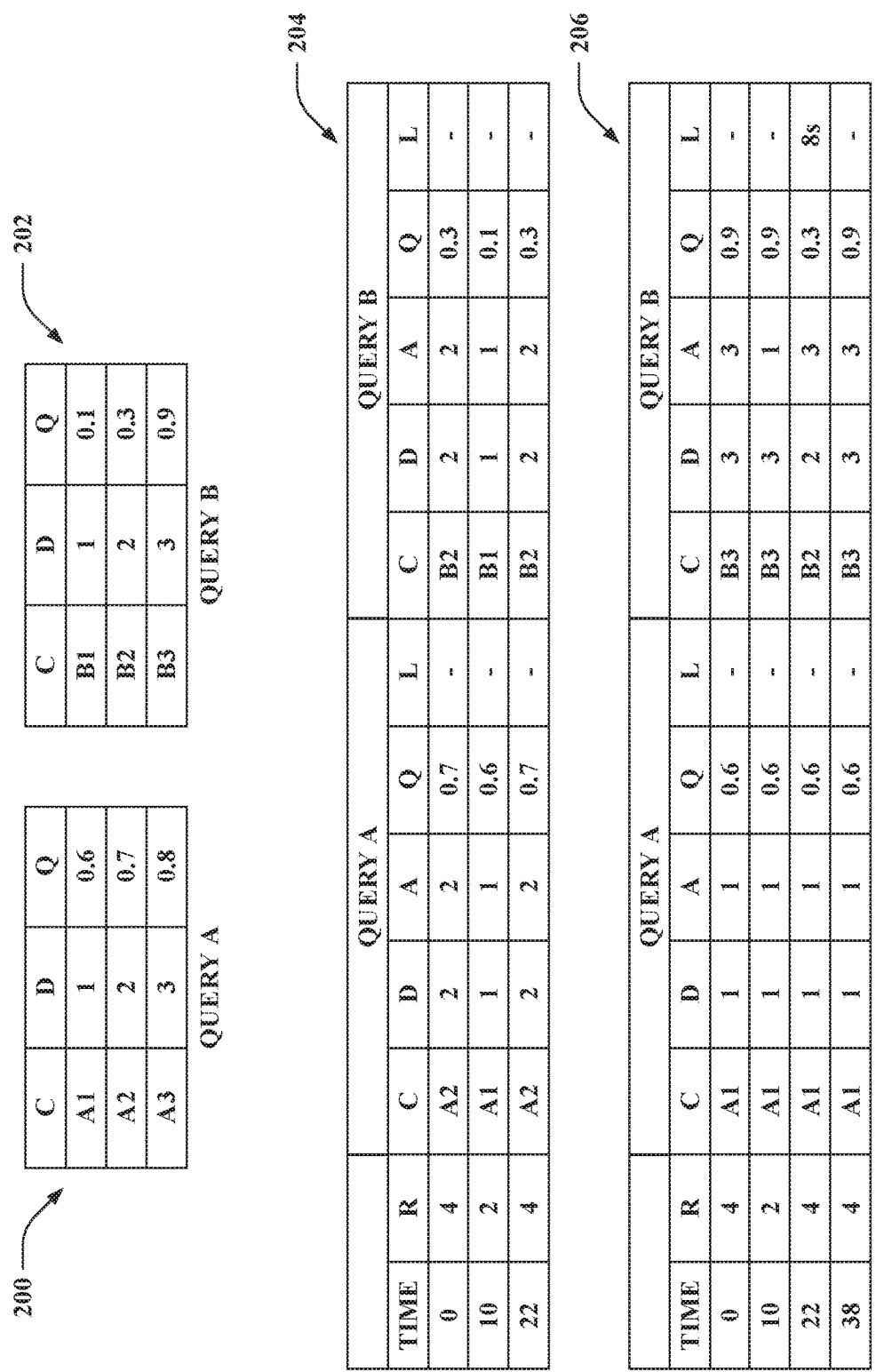
FIG. 2 illustrates an exemplary comparison between fairness-based resource allocation and performance-based resource allocation for dividing resources among multiple video analytics queries.

Now referring to FIG. 2, illustrated is an exemplary comparison between fairness-based resource allocation and performance-based resource allocation for dividing resources among multiple video analytics queries. Query A is shown in table 200, and query B is shown in table 202. Table 200 and table 202 include resource demand D and quality Q for three configurations C of each of the queries (Ax and Bx, respectively). Moreover, table 204 shows time, capacity R, and, for each query, chosen configuration C, demand D, allocation A, achieved quality Q, and lag L for the fairness-based resource allocation. For purposes of comparison, table 206 shows time, capacity R, and for each query, chosen configuration C, demand D, allocation A, achieved quality Q, and lag L for the performance-based resource allocation. Notice in table 206 that query B achieves a higher quality between times 10 and 22 using the performance-based resource allocation as compared to the fairness-based resource allocation shown in table 204, while a lag does not go beyond 8 seconds (e.g., a permissible lag for the query B).

As depicted in tables 200 and 202, an improvement in quality Q for query A is less pronounced than an improvement in quality Q for query B for the same increase in resource demand D (e.g., a 1 unit increase in demand D from 1 to 2 results in a 0.1 unit improvement in quality Q for query A and a 0.2 unit improvement in quality Q for query B). Note that resource demand D is a resource level to keep up with an incoming data rate. Moreover, for the example shown in FIG. 2, query A cannot tolerate any lag, and query B can tolerate up to 8 seconds of lag. Lag can be defined as a difference between a time of a last-arrived frame and a time of a last-processed frame (e.g., how much time's worth of frames are queued and unprocessed).

Further following this example, it can be assumed that a single machine (e.g., one of the worker computing devices 114-116) with resource capacity R of 4 units can run the two queries, A and B. The capacity R drops to 2 units after 10 seconds and then returns to 4 units after 12 more seconds (at 22 seconds). This drop in the capacity of the machine can be caused by another high priority job running on the machine, for example.

As set forth above, table 204 shows the fairness-based resource allocation for the queries A and B. It is noted that a configuration that provides a highest quality Q to keep up with the live stream can be selected (e.g., demand D can be kept at or below allocation A). When employing the fairness-based allocation, both queries can be allocated A of 2 units initially (at time 0); thus, configurations A2 and B2 can be respectively chosen. Thereafter, between times 10 and 22 when the capacity R drops to 2 units, the queries get an allocation A of 1 unit each, which leads to configurations A1 and B1 being selected. With the fair allocation approach, no lag is incurred for either of the queries.

In comparison, as shown in table 206, for the performance-based resource allocation, query A can be allocated A of 1 unit and query B can be allocated A of 3 units initially (at time 0); accordingly, configuration B3 can be selected for query B at time 0, thereby achieving higher quality compared to the fairness-based resource allocation (e.g., 0.3 unit increase in quality for query B, while a quality drop for query A is 0.1 unit due to use of configuration A1 as opposed to configuration A2). Such allocation can be based on the system manager component 122 identifying the value in providing more resources to query B given the resource-quality profile. Moreover, at time 10 when capacity R drops to 2 units, the system manager component 122 can allocate A of 1 unit to each of the queries; however, query configuration B3 can remain for query B. Since the resource demand D of B3 is 3 units, but query B has been allocated only 1 unit at time 10, query B can start to lag. Specifically, for every second, the lag in processing can increase by ⅔ of a second. However, query B can still produce results at quality Q of 0.9 unit, albeit delayed. At time 22, the capacity R recovers and query B has built up a lag of 8 seconds. The system manager component 122 can allocate A of 3 units to query B, but can switch query B to configuration B2 with a demand D of 2 units. This can enable query B to catch up, where for every second it can process 1.5 seconds of video. At time 38, the lag has been eliminated and the system manager component 122 can switch query B back to configuration B3 with quality Q of 0.9 unit.

As shown in the foregoing comparison, the performance-based resource allocation can enable achieving higher total quality by allocating resources based on the resource-quality profiles of the queries. Moreover, the query configurations can be adjusted based on the allocations and the queries can be allowed to catch up to built-in lag.

Figure 3:
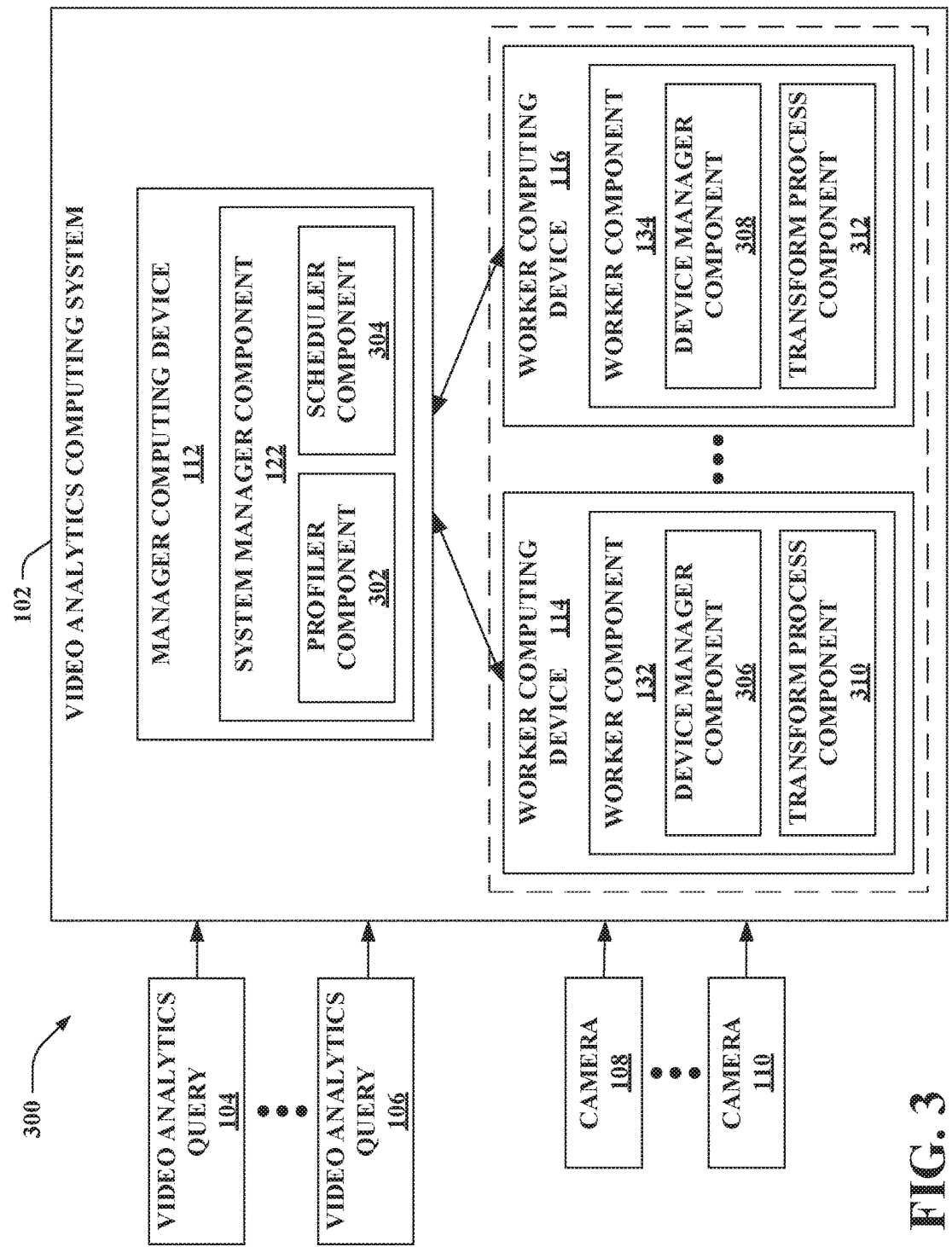
FIG. 3 illustrates a functional block diagram of another exemplary system that performs video analytics.

Turning to FIG. 3, illustrated is another system 300 that performs video analytics. The system 300 again includes the video analytics computing system 102, which further includes the manager computing device 112 and the worker computing devices 114-116. The system manager component 122 of the manager computing device 112 can further include a profiler component 302 and a scheduler component 304. While the system manager component 122 of the manager computing device 112 is depicted to include both the profiler component 302 and the scheduler component 304, it is contemplated that the system manager component 122 can be distributed over more than one manager computing device (e.g., a first manager computing device can include the profiler component 302 and a second manager computing device can include the scheduler component 304).

The profiler component 302 can be configured to generate resource-quality profiles for the video analytics queries 104-106. The resource-quality profiles can specify resource demands and result qualities corresponding to candidate multi-dimensional configurations of the video analytics queries 104-106. Moreover, the scheduler component 304 can be configured to schedule the multiple video analytics queries 104-106 based on the resource-quality profiles of the multiple video analytics queries 104-106 and lag tolerances of the multiple video analytics queries 104-106. The scheduler component 304 can schedule the multiple video analytics queries 104-106 by allocating the resources of the video analytics computing system 102 (e.g., the resources of the worker computing devices 114-116) between the multiple video analytics queries 104-106 for the execution of each of the multiple video analytics queries 104-106. The scheduler component 304 can further be configured to select multi-dimensional configurations for each of the multiple video analytics queries 104-106 based on the resources as allocated. The scheduler component 304 can further place the multiple video analytics queries 104-106 on the worker computing devices 114-116 of the video analytics computing system 102 for the execution of the multiple video analytics queries 104-106. The scheduler component 304 can push the video analytics queries 104-106 as well as the multi-dimensional configurations to the worker computing devices 114-116.

The worker components 132-134 of the worker computing device 114-116 can include device manager components and transform process components. More particularly, the worker component 132 of the worker computing device 114 can include a device manager component 306, . . . , and the worker component 134 of the worker computing device 116 can include a device manager component 308 (collectively referred to herein as device manager components 306-308). Moreover, the worker component 132 of the worker computing device 114 can include a transform process component 310, . . . , and the worker component 134 of the worker computing device 116 can include a transform process component 312 (collectively referred to herein as transform process components 310-312).

The device manager components 306-308 cause the transform process components 310-312 to process transforms that are part of the video analytics queries 104-106. The device manager components 306-308 can autonomously handle short-term fluctuations in the video analytics queries 104-106 and resources. Moreover, the device manager components 306-308 can periodically report resource utilization as well as status of the running transforms back to the system manager component 122 of the manager computing device 112. Accordingly, the scheduler component 304 of the system manager component 122 can use the reported information to allocate resources to the video analytics queries 104-106. The system manager component 122 as well as the device manager components 306-308 can be separate from the query data path; thus, videos from the cameras 108-110 can be streamed to decoding transforms processed by the transform process components 310-312, while control data can flow between the system manager component 122 and the device manager components 306-308.

Figure 4:
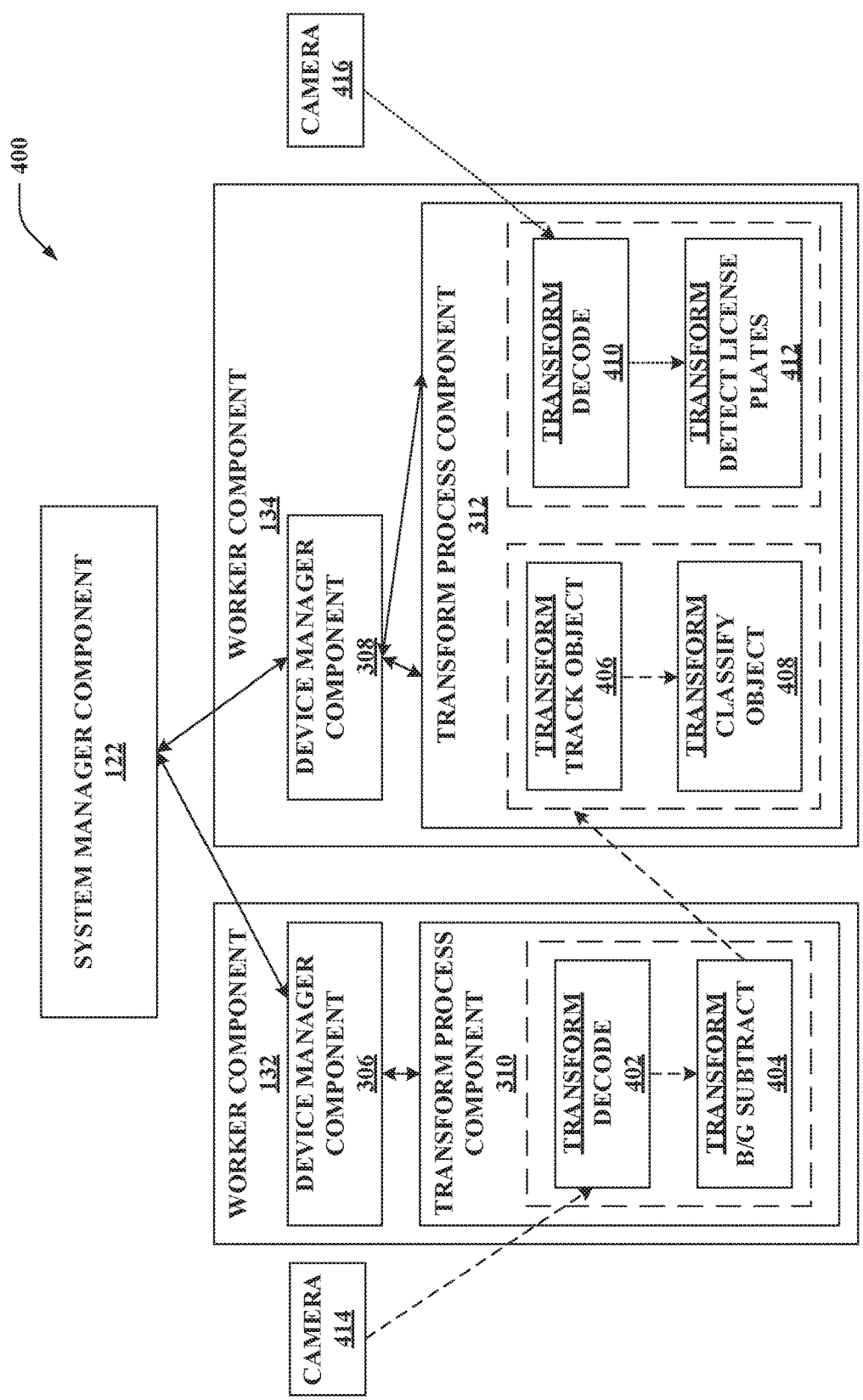
FIG. 4 illustrates a functional block diagram of an exemplary system showing an exemplary scenario where two video analytics queries are performed.

With reference to FIG. 4, illustrated is an exemplary system 400 showing an exemplary scenario where two video analytics queries are performed. The system 400 includes the system manager component 122, the worker component 132, and the worker component 134. Although not shown, the manager computing device 112 can include the system manager component 122, the worker computing device 114 can include the worker component 132, and the worker computing device 116 can include the worker component 134.

Transforms of a video analytics query can include at least a first transform and a second transform. According to an example, the first transform and the second transform can be placed on a common worker computing device (of the video analytics computing system 102) for execution. Pursuant to another example, the first transform can be placed on a first worker computing device (of the video analytics computing system 102) for execution, and the second transform can be placed on a second worker computing device (of the video analytics computing system 102) for execution.

As described herein, a time-ordered stream of messages (e.g., video frames) can be inputted to each of the transforms, and the transforms can provide outputs to downstream transforms. In accordance with the example depicted in FIG. 4, a first video analytics query can be or include a pipeline of transforms including a decode transform 402, a background subtraction transform 404, a track object transform 406, and a classify object transform 408. A second video analytics query can be or include a pipeline of transforms including a decode transform 410 and a detect license plates transform 412.

As shown, the first video analytics query can be run across two machines (e.g., the first video analytics query can be executed by the worker component 132 of the worker computing device 114 and the worker component 134 of the worker computing device 116). More particularly, the decode transform 402 and the background subtraction transform 404 are placed on the worker computing device 114 for execution by the worker component 132, and the track object transform 406 and the classify object transform 408 are placed on the worker computing device 116 for execution by the worker component 134. Further, the second video analytics query can be executed by one machine (e.g., the worker component 134 of the worker computing device 116 can execute the second video analytics query). Thus, the decode transform 410 and the detect license plates transform 412 are placed on the worker computing device 116 for execution by the worker component 134.

When processing the first video analytics query, a video stream can be inputted from a camera 414 to the worker computing device 114, such that the video stream is provided to the decode transform 402. The video stream received from the camera 414 can be processed, such that the decode transform 402, the background subtraction transform 404, the track object transform 406, and the classify object transform 408 are performed on frames of the video stream (e.g., the transforms 402-408 can be sequentially performed on a frame of the video stream as represented by the arrows between the transforms 402-408 in FIG. 4). As depicted, an output of the background subtraction transform 404 is transmitted from the worker component 132 (e.g., the worker computing device 114) to the worker component 134 (e.g., the worker computing device 116).

Moreover, when processing the second video analytics query, a video stream can be inputted from a camera 416 to the worker computing device 116, such that the video stream is provided to the decode transform 410. The video stream received from the camera 416 can be processed, such that the decode transform 410 is performed on frames of the video stream and then the detect license plates transform 412 is performed on the output of the decode transform 410.

Figure 5:
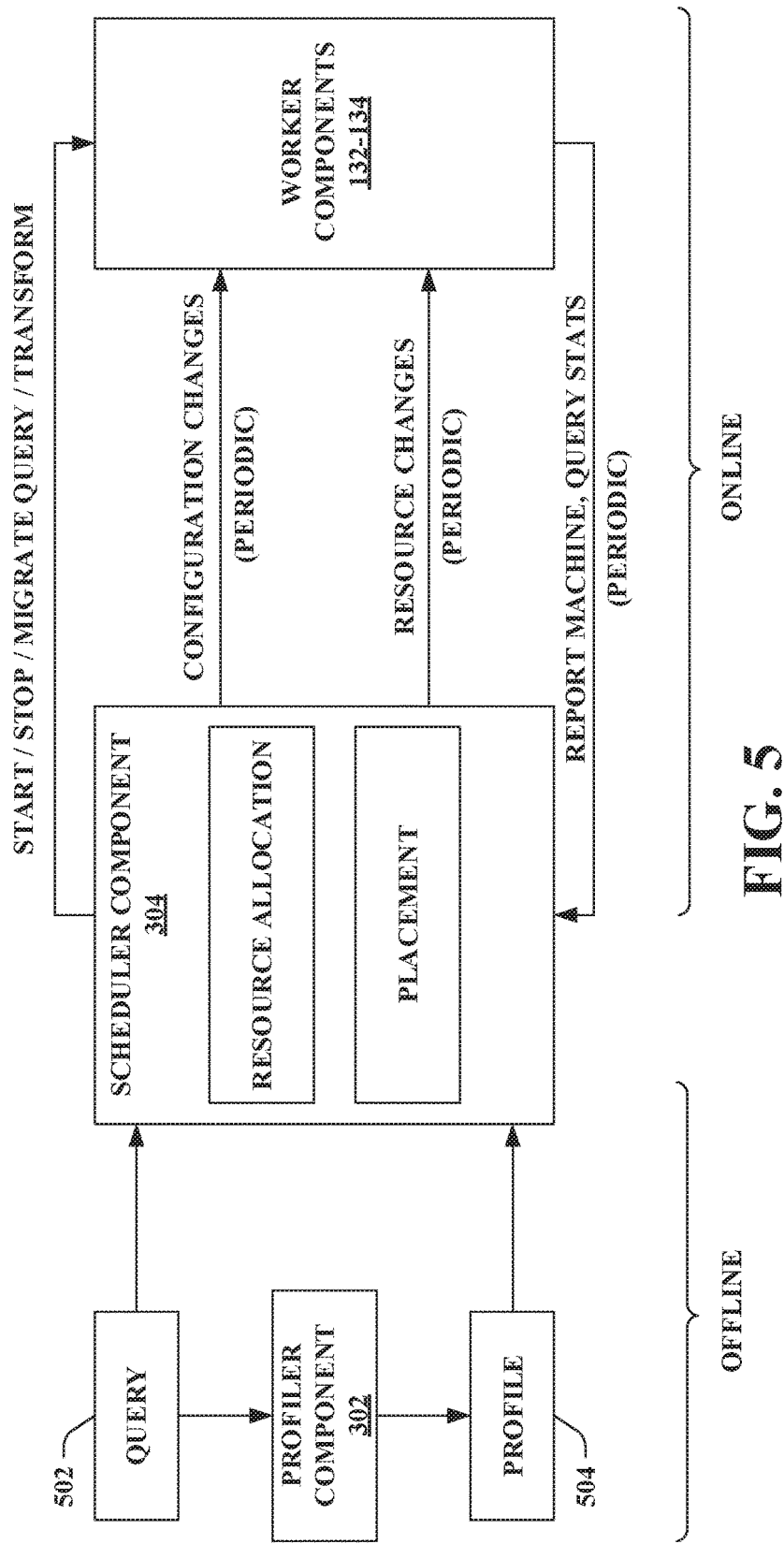
FIG. 5 illustrates an example of a profiler component and a scheduler component from FIG. 3 in greater detail

Turning to FIG. 5, illustrated is an example of the profiler component 302 and the scheduler component 304 of the system manager component 122 in greater detail. According to the example shown in FIG. 5, the profiler component 302 can implement offline profiling, and the scheduler component 304 can implement online scheduling.

In an offline phase, the profiler component 302 can efficiently generate resource-quality profiles for queries. As shown in the illustrated example, the profiler component 302 can generate a resource-quality profile 504 (e.g., a query profile) for a query 502 (e.g., one of the video analytics queries 104-106). The profiler component 302 can generate the resource-quality profile 504 of the video analytics query 502 by identifying candidate multi-dimensional configurations utilizing a greedy local search in a resource-quality space. The candidate multi-dimensional configurations can be a subset of potential multi-dimensional configurations. Further, the candidate multi-dimensional configurations can be on a Pareto boundary. Thus, the profiler component 302 can generate the resource-quality profile 504 with a small number of configurations on the Pareto curve, which can reduce the configurations to be considered by the scheduler component 304.

The scheduler component 304, in the online phase, can allocate resources (e.g., of the video analytics computing system 102) between multiple video analytics queries (e.g., the video analytics queries 104-106) for execution of the video analytics queries. The scheduler component 304 can also place the multiple video analytics queries on the worker components 132-134 (e.g., the worker computing device 114-116) for execution of the multiple video analytics queries.

The scheduling of the multiple video analytics queries can be periodically adjusted by the scheduler component 304 over time based on changes in resource demands across the multiple video analytics queries and resource capacity (e.g., of the video analytics computing system 102). According to an illustration, every time period (e.g., every second or some other time period), the scheduler component 304 can consider the running video analytics queries and can adjust the resource allocation, machine placement, and configurations based on the profiles, changes in demand, and/or capacity. The quality and lag requirements of each individual query can be encoded into a utility function, as described in greater detail herein. For example, the performance goal across video analytics queries can be specified as maximizing the minimum utility or the sum of utilities.

The scheduler component 304 can start, stop, migrate queries and/or transforms that are effectuated utilizing the worker components 132-134. Moreover, the scheduler component 304 can periodically change configurations for the video analytics queries executed by the worker components 132-134. The scheduler component 304 can further effectuate periodic resource changes, such that resources utilized for executing the queries can be changed over time. The worker components 132-134 can further report machine and/or query statistics back to be scheduler component 304 (e.g., reported back to the system manager component 122). The reporting can be performed periodically.

Reference is again made to FIG. 3. When a new video analytics query is submitted to the video analytics computing system 102, the system manager component 122 can start executing the newly submitted query utilizing a default profile (e.g., the default profile can be for a substantially similar query performed on a video stream from a different one of the cameras 108-110). For instance, the scheduler component 304 can initially schedule the newly submitted query based on the default profile. Concurrently, the profiler component 302 can perform offline profiling of the newly submitted video analytics query.

Various aspects pertaining to the profiler component 302 are now provided. The profiler component 302 can select a subset of potential multi-dimensional configurations (e.g., on a Pareto boundary) from a resource-quality space. Moreover, the profiler component 302 can compute a resource-quality profile $\mathcal{F}_k$ (e.g., resource demands and result qualities of the selected configurations) for the query k. The profile can be computed either against a labeled dataset or using an initial part of a streaming video relative to a predetermined query configuration known to produce high-quality results.

An example of a video analytics query is a license plate reader query that reads license plates from a video stream. Following this example, the query scans a video frame to detect potential plates; thereafter, text on the plates can be recognized using optical character recognition. In general, using higher video resolution and processing each frame can be utilized to provide a higher quality detection of license plates. Reducing the resolution and processing only a subset of the frames (e.g., sampling rate of 0.25) can reduce resource demand, but can also reduce the quality of the output (e.g., resulting in missed or incorrectly read license plates). Knobs that can be employed for the license plate reader query can include frame resolution and sampling rate as well as MinSize, Step, and MaxSize. For instance, the query can scan an image for license plates of size MinSize, then multiplicatively increase the size by Step; the foregoing can be repeated until the size reaches MaxSize. The set of potential license plates can then be sent to an optical character recognizer.

Following the above example of the license plate reader query, qualities of configurations (e.g., combinations of the five knobs above) can be estimated on a labeled dataset using the F1 score, the harmonic mean between precision and recall. Accordingly, 0 and 1 represent the lowest and highest qualities. For example, increasing MinSize or decreasing MaxSize can reduce the resources needed, but can result in some plates being missed and quality being decreased.

It is contemplated that there can be a significant spread in quality among configurations with similar resource usages. Moreover, it is to be appreciated that there can be a significant spread in resource usage among configurations that achieve similar quality.

According to an example, the profiler component 302 can implement a greedy local search to identify configurations with high quality Q and low demand D. Notation used herein for a video analytics query k (e.g., from the video analytics queries 104-106) is set forth below.

| Term | Description |
| --- | --- |
| $\mathcal{P}_k$ | profile of query k |
| $c_k \in \mathcal{C}_k$ | specific configuration of query k |
| $Q_k(c)$ | quality under configuration c |
| $D_k(c)$ | resource demand under configuration c |
| $L_{k,t}$ | measured lag at time t |
| $U_k$ | utility |
| $Q_k^M$ | minimum quality goal |
| $L_k^M$ | maximum lag goal |
| $a_k$ | resources allocated |

The profiler component 302 can implement hill climbing. For instance, the profiler component 302 can select a random configuration c, compute quality Q(c) and resource demand D(c) for the configuration c by running the query with c on a subset of the video dataset, and compute $X(c)=Q(c)-\beta D(c)$ In the foregoing, β trades off between quality and demand. The profiler component 302 can then select a neighbor configuration n (by changing a value of a random knob in c). The quality Q(n) and resource demand D(n) for the configuration n can similarly be computed, and $X(n)=Q(n)-\beta(n)$ can be computed. If X(n)>X(c), then n is better than c in quality or resource demand (or both); when X(n)>X(c), the profiler component 302 can set c=n and can repeat the foregoing. When a better neighbor cannot be found (e.g., exploration indicates that a local optimum is identified), the foregoing can be repeated by picking another random c.

One or more exemplary enhancements can increase the efficiency of the search. According to an example, to mitigate starting with an expensive configuration and exploring its neighbors (which can waste CPU resources), the profiler component 302 can select k random configurations, and can start from one of the random configurations with a highest X(c) from the k random configurations. For instance, k=3 can be used; however, the claimed subject matter is not so limited. Pursuant to another example, the profiler component 302 can cache intermediate results in a DAG of a video analytics query; the profiler component 302 can reuse the intermediate results in evaluating configurations with overlapping knob values. According to a further example, hyper-parameter searches can be used to enhance efficiency. Yet, it is to be appreciated that the claimed subject matter is not limited to the foregoing examples.

The profiler component 302 can identify a subset of configurations that are on the Pareto boundary $\mathcal{F}$ of the resource-quality space. Let Q(c) be the quality and D(c) be the resource demand under configuration c. If $c_1$ and $c_2$ are two configurations such that $Q(c_1) \geq (c_2)$ and $D(c_1) \leq D(c_2)$, then $c_2$ may not be useful in practice; under the foregoing scenario, $c_1$ is better than $c_2$ in both quality and resource demand. Accordingly, the profiler component 302 can extract the Pareto boundary of the explored configurations, which is referred to herein as the resource-quality profile $\mathcal{F}$ of the video analytics query.

It is to be appreciated that use of the greedy local search can enable reducing CPU resource usage for identifying a resource-quality profile for a video analytics query as compared to other techniques for generating the resource-quality profile. Yet, is it contemplated that the claimed subject matter is not limited to the profiler component 302 employing the greedy local search.

Various aspects pertaining to the scheduler component 304 are now set forth. The scheduler component 304 can consider utilities of individual video analytics queries 104-106 and cluster-wide scheduling objective. The scheduler component 304 can periodically perform resource allocation and query placement. As part of resource allocation, it can be assumed that the video analytics computing system 102 is an aggregate bin of resources; the scheduler component 304, for example, can use an efficient scheduling heuristic to maximize cluster-wide performance by adjusting query allocation and configuration. Moreover, at the part of query placement, the scheduler component 304 can place new queries (e.g., video analytics queries newly received by the manager computing system 112) to the worker computing devices 114-116 in the video analytics computing system 102 and/or migrate existing queries between the worker computing devices 114-116.

Preferences can be set for each of the video analytics queries 104-106. The preferences can specify desired quality and lag. For instance, the preferences can set a minimum quality goal ($Q^M$). The preferences can also specify how much a query benefits from higher quality than the goal. Further, the preferences can set a maximum lag goal ($L^M$). The maximum lag goal can indicate a maximum amount of tolerated lag and how sensitive the query is to violations of this goal. The foregoing preferences can be encoded in utility functions.

The utility function for a query can have the following form, where $(x)_+$ is the positive part of x. Query index k can be omitted for clarity.

$$U(Q, L) = U^B + U^Q(Q) - U^L(L)$$
$$= U^B + \alpha^Q \cdot (Q - Q^M)_+ - \alpha^L \cdot (L - L^M)_+$$

$U^B$ is a baseline utility for meeting quality and lag goals (e.g., when $Q=Q^M$ and $L=L^M$). The second term, $U^Q$, describes how the utility responds to achieved quality Q above $Q^M$, the soft quality goal. A multiplier $\alpha^Q$ and the minimum quality goal $Q^M$ are query specific and can be set based on the application analyzing the video. Results with quality below the minimum quality goal $Q^M$ are typically not useful. The third term, $U^L$, represents a penalty for results arriving later than the maximum lag goal $L^M$. Further, a multiplier $\alpha^L$ can be in units of (1/second), making $U^L$ dimensionless.

As noted above, lag is a difference between a current time and an arrival time of a last processed frame. By way of illustration, if at time 10:30 a frame that arrived at 10:15 is processed, then the lag is 15 minutes. Moreover, it is contemplated that there may not be a benefit provided for a lag being below $L^M$.

Various scheduling objectives can be utilized by the scheduler component 304 given utilities of individual queries. Scheduling objectives can be utilized to define utility or performance of the entire video analytics computing system 102. According to an example, the scheduling objective can be based on maximizing the sum of utilities. Pursuant to another example, the scheduling objective can be based on a maximum-minimum fairness over utilities.

Given a profile $\mathcal{P}_k$ and a utility function $U_k$ for each query k, the scheduler component 304 can allocate resources $a_k$ to the queries and can select multi-dimensional configurations for such queries ($c_k \in \mathcal{P}_k$). The scheduler component 304 can periodically run (e.g., every few seconds) and can react to arrival of new queries, changes in query demand and lag, and changes in resource capacity of the video analytics computing system 102 (e.g., due to types of jobs other than execution of the video analytics queries 104-106).

The scheduler component 304 can perform scheduling utilizing MPC. The scheduler component 304 can aim to maximize the minimum or sum of query utilities, which can depend on quality and lag. It is noted that while query quality can be instantaneously controlled by adjusting the configuration for the query, query lag accumulates over time if less resources than query demand is allocated.

Because of the accumulation property, the scheduler component 304 can be employed to predict lags of the multiple video analytics queries 104-106 over a time horizon. The multiple video analytics queries 104-106 can be scheduled by the scheduler component 304 based on the predicted lags. Accordingly, the scheduler component 304, rather than optimizing the current performance, can optimize performance in the near future. The scheduling problem can be formulated using the MPC framework, where cluster performance over a time horizon T can be modeled as a function of query configuration and allocation. In each step, the scheduler component 304 can select the configuration and allocation to maximize performance over the near future.

To predict future performance, the scheduler component 304 can predict query lag as set forth below:

$$L_{k,t+T}(a_k, c_k) = L_{k,t} + T - T\frac{a_k}{D_k(c_k)}$$

$L_{k,t+T}$, an expected lag after time T, is a current lag $L_{k,t}$ plus the lag that accumulates due to arrival of new data minus the data processed in time T. The lag that accumulates depends on the resource allocation $a_k$ and the query demand $D_k(c_k)$ in configuration $c_k$. If $a_k = D_k(c_k)$ is assigned, then no additional lag accumulates. To catch up on a current lag, the resource allocation can be increased beyond the demand. Time horizon T is a parameter that determines how far into the future the scheduling decision is made by the scheduler component 304. Moreover, the predicted lag $L_{k,t+T}$ can be utilized in the utility function to obtain a predicted utility.

Resource allocation performed by the scheduler component 304 is now further described. In the below example, for purposes of explanation, it is assumed that each query includes one transform; yet, it is to be appreciated that the claimed subject matter is not so limited.

According to an example, the scheduler component 304 can employ a scheduling heuristic for maximizing the sum of utilities to allocate resources. It is noted that the sum of allocated resources $a_k$ cannot exceed resource capacity R of the video analytics computing system 102. An exemplary optimization problem for maximizing the sum of utilities over time horizon T is set forth below:

$$\max_{a_k, c_k \in \mathcal{P}_k} \Sigma_k U_k(Q_k(c_k), L_{k,t+T})$$
$$\text{s.t. } \Sigma_k a_k \leq R$$
$$L_{k,t+T} = L_{k,t} + T - T\frac{a_k}{D_k(c_k)}$$

Maximizing the sum of utilities can be a variant of the knapsack problem, where it is attempted to include the queries at different allocation and configuration to maximize the total utility. Maximization can result in a distribution of resources.

When including query k at allocation $a_k$ and configuration $c_k$, $a_k$ can be considered a cost paid and a received value can be $u_k = U_k(Q_k(c_k), L_{k,t+T})$. A greedy approximation can be utilized, where queries can be preferred that have a highest value of $u_k/a_k$ (e.g., queries that receive a largest increase in utility normalized by resource spent).

Accordingly, the scheduler component 304 can utilize the following scheduling heuristic. The scheduler component 304 can start with $a_k=0$. In each step, the scheduler component 304 can consider increasing $a_i$ (for queries i) by $\Delta$ (e.g., a step increase such as 1% of a core) and can consider configurations of $c_i \in \mathcal{P}_i$. Among these options, the scheduler component 304 can select the query i (and the corresponding configuration $c_i$) with a largest increase in utility. The scheduler component 304 can repeat the foregoing until resources are exhausted or until a best configuration for each query is selected.

According to another example, the scheduler component 304 can employ a scheduling heuristic for maximizing the minimum utility to allocate resources. Below is the optimization problem to maximize the minimum utility predicted over a time horizon T. Utilities are $\geq u$, and u is maximized.

$$\max_{a_k, c_k \in \mathcal{P}_k} u$$
$$\text{s.t.} \ \forall k: U_k(Q_k(c_k), L_{k,t+T}) \geq u$$
$$\Sigma_k a_k \leq R$$
$$L_{k,t+T} = L_{k,t} + T - T \frac{a_k}{D_k(c_k)}$$

When maximizing the minimum utility, u can be improved by improving the utility of a worst query. Accordingly, the scheduler component 304 can employ the following scheduling heuristic. The scheduler component 304 can start with $a_k=0$ for all queries. In each step, the query $i = \text{argmin}_k U_k(Q_k(c_k), L_{k,t+T})$ with a lowest utility can be selected to increase its allocation by a $\Delta$ (e.g., a step increase such as 1% of a core). With this allocation, the scheduler component 304 can compute a configuration $c_i$ as argmax $c \in \mathcal{P}_i U_i(Q_i(c), L_{i,t+T})$. The foregoing can be repeated by the scheduler component 304 until resources are exhausted or until a best configuration for each query is selected.

After determining resource allocation and configuration of each query, the scheduler component 304 can determine placement of new queries and migration of existing queries. The suitability of placing a query q on a machine m (e.g., a worker computing device) can be quantified by the scheduler component 304 based on scores for the following goals: high utilization, load balancing, and spreading low lag queries.

High utilization in the video analytics computing system 102 can be achieved by packing queries into machines, thereby minimizing fragmentation and wastage of resources. An alignment of a query relative to a machine can be defined using a weighted dot product p (e.g., $p \in [0,1]$) between a vector of the machines available resources and the resource demands of the query.

Load can be spread across the video analytics computing system 102. Such load balancing enables each machine to have spare capacity to handle changes in demand. Thus, a query q can be placed on a machine m with a smallest utilization. The foregoing can be captured in a score $$b = 1 - \frac{M+D}{M_{max}} \in [0,1],$$

where M is a current utilization of machine m and D is demand of query q.

Moreover, the query can be placed by the scheduler component 304 based on lag spreading. It can be desired to not concentrate a significant number of low-lag queries on a machine; accordingly, slack can be provided to accumulate lag for other queries (other than the low-lag queries) when resources are scarce without having to resort to migration of queries or violations of lag goals $L^M$. The foregoing can be achieved by maintaining high average $L^M$ on each machine. Thus, the scheduler component 304 can compute $l \in [0,1]$ as the average $L^M$ after placing the query q on the machine m.

A final score $s_{q,m}$ computed by the scheduler component 304 can be an average of the above three scores; however, the claimed subject matter is not so limited (e.g., other scores can additionally or alternatively be used, all three of the foregoing scores need not be used by the scheduler component 304). For each new query q, it can be placed on a machine with a largest $s_{q,m}$. For each existing query q, migration from the machine $m_0$ to a new machine $m_1$ can be supported when the score improves above a threshold $\tau$ (e.g., $s(q, m_1) - s(q, m_0) > \tau$).

According to an illustration, it is contemplated that a profiled resource demand, $D_k(c_k)$, included as part of a resource-quality profile of a video analytics query may not correspond to an actual query demand (e.g., when demand depends on video content). Using incorrect demand can negatively impact scheduling. For example, if $D_k(c)=10$, but actual usage is $R_k=100$, then the scheduler component 304 would estimate that allocating $a_k=20$ would reduce query lag at a rate 2x, while the lag would actually grow at a rate of 5x.

To address the foregoing, the system manager component 122 can track a misestimation of the resource demands specified in the resource-quality profile of a particular video analytics query during execution of the particular video analytics query over time. Accordingly, the particular video analytics query can be scheduled by the scheduler component 304 based on the misestimation. The system manager component 122 can track a running average of misestimation $$\mu = \frac{R_k}{D_k(c)},$$

which represents a multiplicative error between the predicted demand and actual usage. The system manager component 122 (e.g., the scheduler component 304) can incorporate the misestimation $\mu$ in the lag predictor described above; for example, the misestimation can be included as follows:

$$L_{k,t+T}(a_k, c_k) = L_{k,t} + T - T \frac{a_k}{D_k(c_k)}\left(\frac{1}{\mu}\right).$$

Moreover, according to an example, it is to be appreciated that machine level scheduling can be implemented by the device manager components 306-308. For instance, if a query fits on a single worker computing device (e.g., one of the worker computing devices 114-116), then the device manager component of such worker computing device can respond to changes in demand or lag at the machine level, without waiting for a decision to be made by the system manager component 122. Accordingly, the device manager component can execute the allocation described above, which can make the scheduling logic more scalable. Following this example, cluster wide scheduling performed by the scheduler component 304 can continue to perform allocation for purposes of determining query placement and migration, while the machine level scheduling can be implemented by the device manager components 306-308.

Moreover, as described herein, the video analytics queries 104-106 can include a DAG of transforms that can be placed across multiple worker computing devices 114-116. Pursuant to an example, it is contemplated that the query resource allocation $a_k$ can be distributed to individual transforms based on per-transform resource demands. Following this example, the individual transforms can then be placed to machines by the scheduler component 304, while accounting for the expected data flow across machines and network link capacities. However, the claimed subject matter is not limited to the foregoing example.

While many of the examples set forth herein pertain to processing the video analytics queries 104-106, it is contemplated that the features described herein can be extended to processing other types of analytics queries. For instance, the techniques described herein can be used for various machine learning processing or other data processing, so long as queries being processed have multiple knobs, or parameters, that can be adjusted, which can result in change in quality and/or resource demand.

Figure 6:
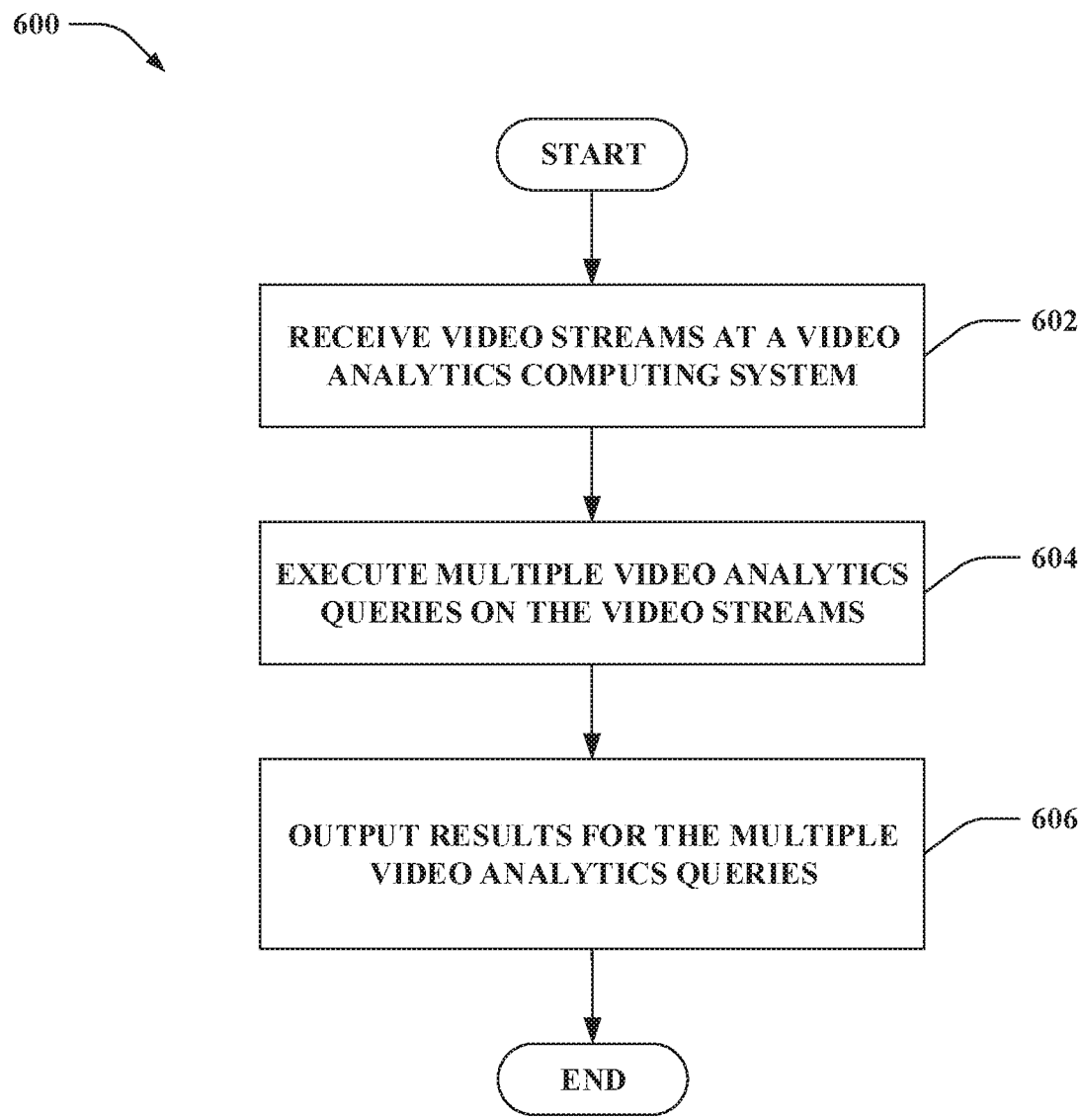
FIG. 6 is a flow diagram that illustrates an exemplary methodology of performing video analytics.
Figure 7:
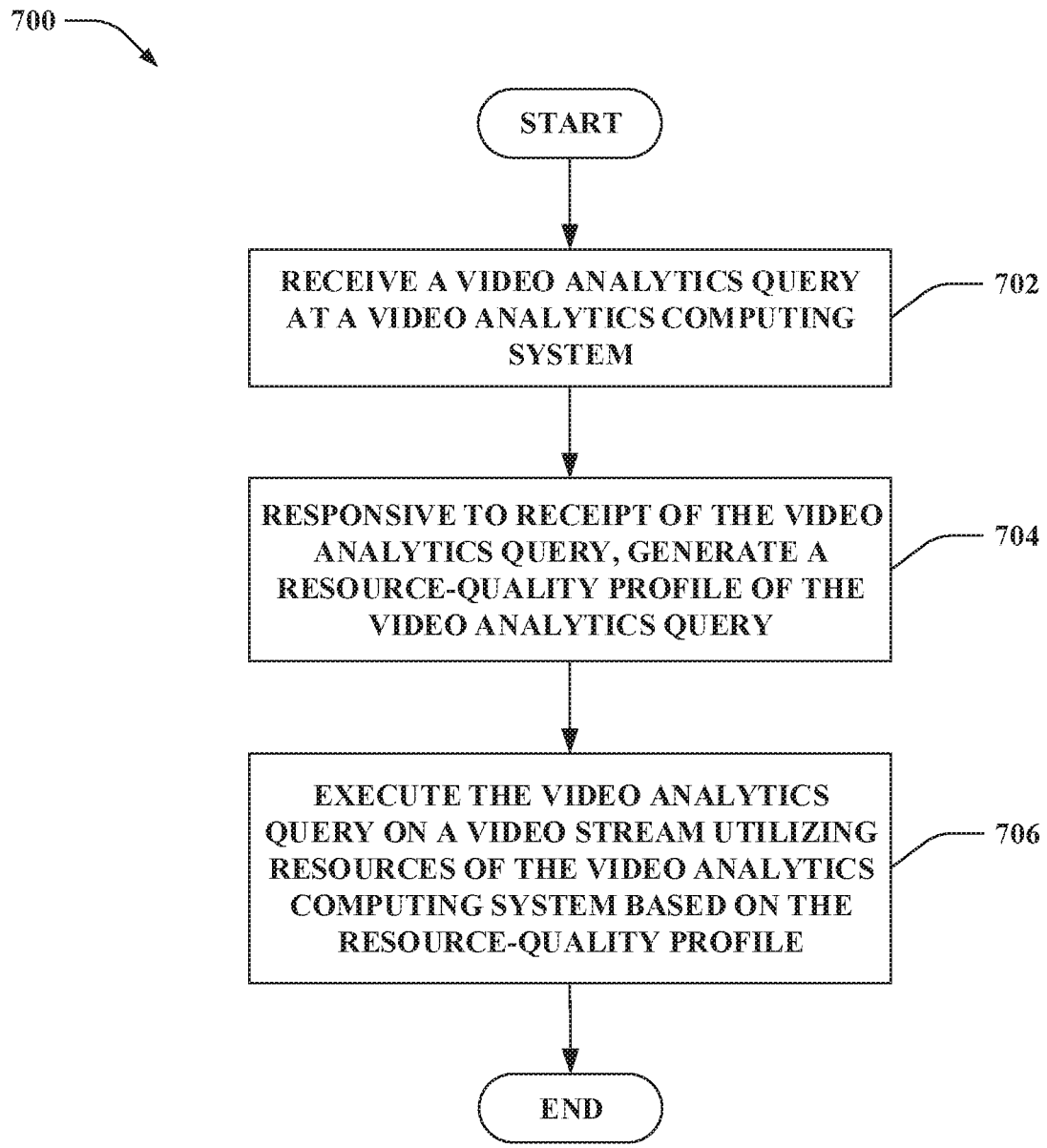
FIG. 7 is a flow diagram that illustrates another exemplary methodology of performing video analytics.
Figure 8:
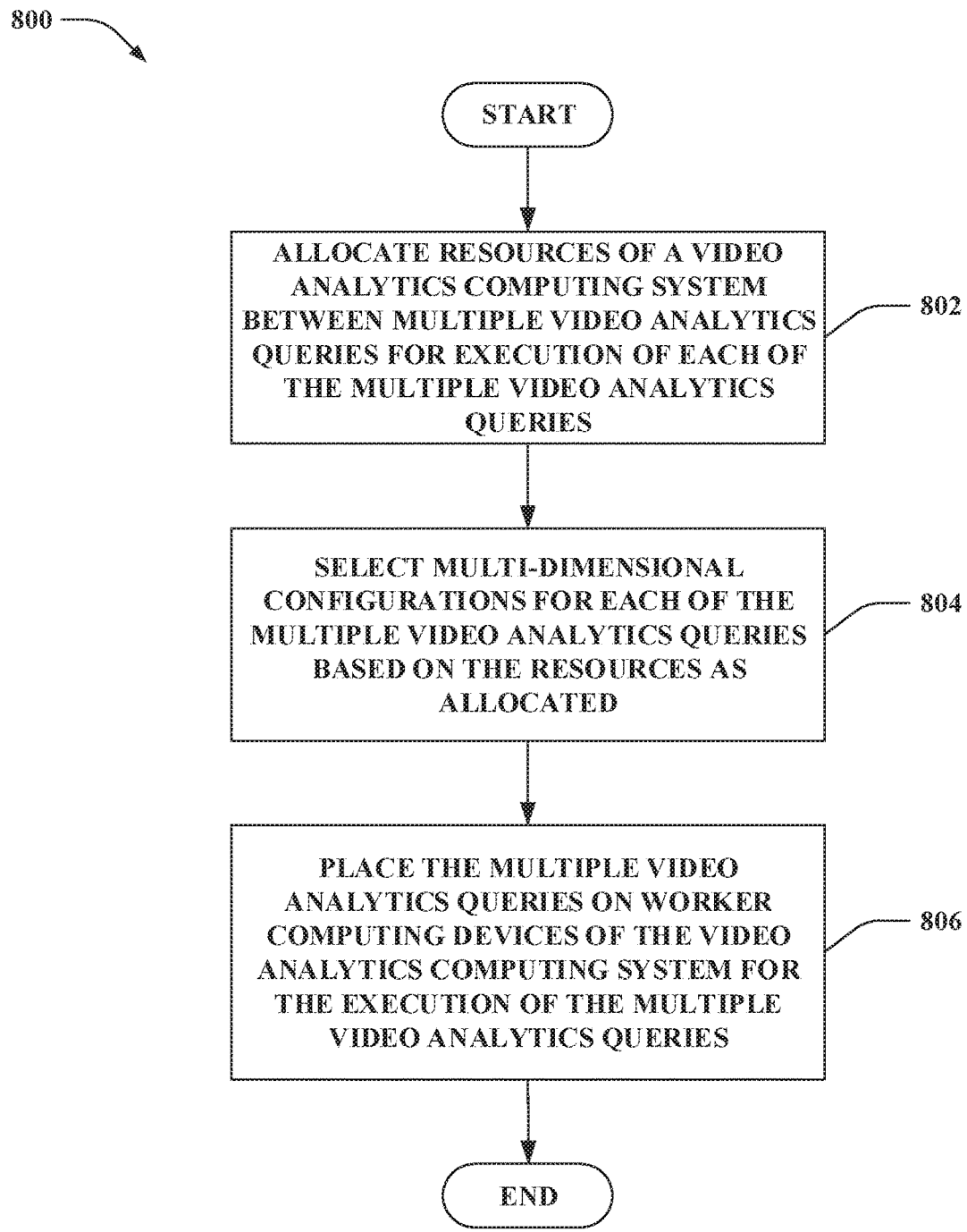
FIG. 8 is a flow diagram that illustrates an exemplary methodology of scheduling multiple video analytics queries.

FIGS. 6-8 illustrate exemplary methodologies relating to performing video analytics. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 6 illustrates a methodology 600 of performing video analytics. At 602, video streams can be received at a video analytics computing system. The video streams can be captured by multiple cameras and continuously streamed to the video analytics computing system. At 604, multiple video analytics queries can be executed on the video streams. The multiple video analytics queries can be concurrently executed by the video analytics computing system on the video streams as the video streams are continuously streamed to the video analytics computing system. Moreover, the multiple video analytics queries can be executed utilizing resources of the video analytics computing system allocated between the multiple video analytics queries. Execution of the multiple video analytics queries can return respective results for the multiple video analytics queries. At 606, the results for the multiple video analytics queries can be outputted.

Turning to FIG. 7, illustrated is a methodology 700 of performing video analytics. At 702, a video analytics query can be received at a video analytics computing system. At 704, responsive to receipt of the video analytics query, a resource-quality profile of the video analytics query can be generated. The resource-quality profile can specify resource demands and result qualities corresponding to candidate multi-dimensional configurations of the video analytics query. At 706, the video analytics query can be executed on a video stream utilizing resources of the video analytics computing system based on the resource-quality profile.

With reference to FIG. 8, illustrated is a methodology of scheduling multiple video analytics queries. At 802, resources of a video analytics computing system can be allocated between the multiple video analytics queries for execution of each of the multiple video analytics queries. The multiple video analytics queries can concurrently be executed by the video analytics computing system on video streams as the video streams are streamed to the video analytics computing system from multiple camera. At 804, multi-dimensional configurations for each of the multiple video analytics queries can be selected based on the resources as allocated. The multiple video analytics queries can be executed utilizing the multi-dimensional configurations. At 806, the multiple video analytics queries can be placed on worker computing devices of the video analytics computing system for the execution of the multiple video analytics queries.

Figure 9:
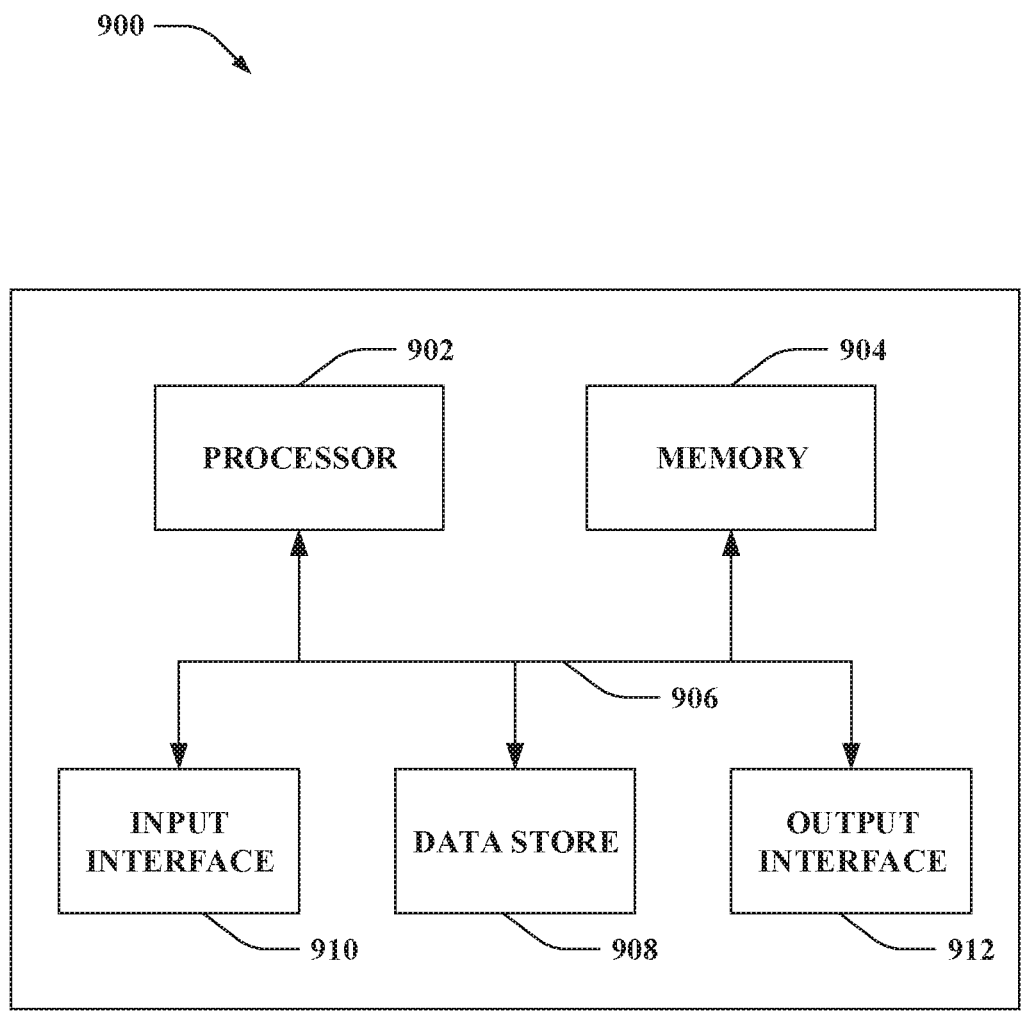
FIG. 9 illustrates an exemplary computing device.

Referring now to FIG. 9, a high-level illustration of an exemplary computing device 900 that can be used in accordance with the systems and methodologies disclosed herein is illustrated. For instance, the video analytics computing system 102 can include the computing device 900 (e.g., the computing device 900 can be the manager computing device, the computing device 900 can be one of the worker computing devices 114-116). By way of another example, the computing device 900 can be communicatively coupled with the video analytics computing system 102 (e.g., the computing device 900 can send a video analytics query to the video analytics computing system 102, the computing device 900 can receive a notification generated by the video analytics computing system 102). The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store video analytics queries, resource-quality profiles, video streams (or portions thereof), and so forth.

The computing device 900 additionally includes a data store 908 that is accessible by the processor 902 by way of the system bus 906. The data store 908 may include executable instructions, video analytics queries, resource-quality profiles, video streams (or portions thereof), etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Figure 10:
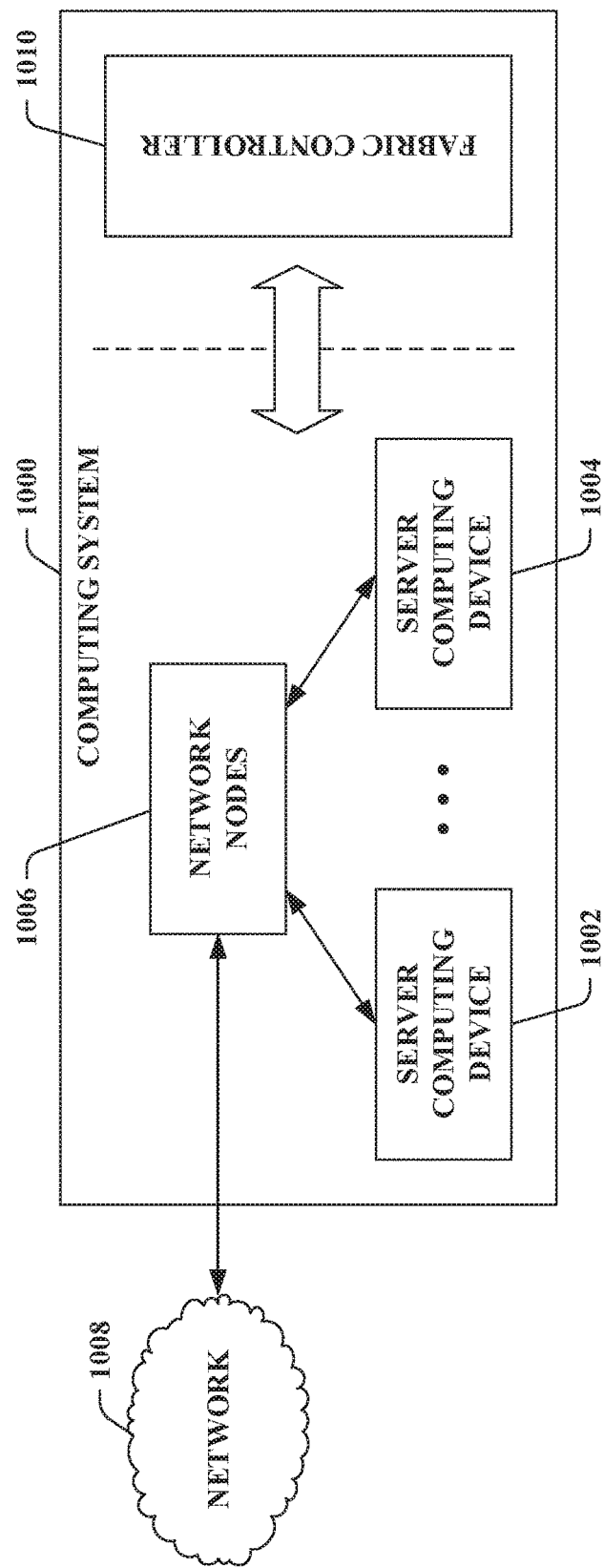
FIG. 10 illustrates an exemplary computing system.

Turning to FIG. 10, a high-level illustration of an exemplary computing system 1000 that can be used in accordance with the systems and methodologies disclosed herein is illustrated. For instance, the computing system 1000 can be or include the video analytics computing system 102. Additionally or alternatively, the video analytics computing system 102 can be or include the computing system 1000.

The computing system 1000 includes a plurality of server computing devices, namely, a server computing device 1002, . . . , and a server computing device 1004 (collectively referred to as server computing devices 1002-1004). The server computing devices 1002-1004 can be or include the manager computing device 112 and the worker computing devices 114-116. The server computing device 1002 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1002, at least a subset of the server computing devices 1002-1004 other than the server computing device 1002 each respectively include at least one processor and a memory. Moreover, at least a subset of the server computing devices 1002-1004 include respective data stores.

Processor(s) of one or more of the server computing devices 1002-1004 can be or include the processor 118 and the processors 124-126. Further, a memory (or memories) of one or more of the server computing devices 1002-1004 can be or include the memory 120 and the memories 128-130.

The computing system 1000 further includes various network nodes 1006 that transport data between the server computing devices 1002-1004. Moreover, the network nodes 1002 transport data from the server computing devices 1002-1004 to external nodes (e.g., external to the computing system 1000) by way of a network 1008. The network nodes 1002 also transport data to the server computing devices 1002-1004 from the external nodes by way of the network 1008. The network 1008, for example, can be the Internet, a cellular network, or the like. The network nodes 1006 include switches, routers, load balancers, and so forth.

A fabric controller 1010 of the computing system 1000 manages hardware resources of the server computing devices 1002-1004 (e.g., processors, memories, data stores, etc. of the server computing devices 1002-1004). The fabric controller 1010 further manages the network nodes 1006. Moreover, the fabric controller 1010 manages creation, provisioning, de-provisioning, and supervising of virtual machines instantiated upon the server computing devices 1002-1004.

Various examples are now set forth.

Example 1

A method of performing video analytics, comprising: receiving video streams at a video analytics computing system, the video streams being captured by multiple cameras and continuously streamed to the video analytics computing system; executing multiple video analytics queries on the video streams, the multiple video analytics queries concurrently being executed by the video analytics computing system on the video streams as the video streams are continuously streamed to the video analytics computing system, the multiple video analytics queries being executed utilizing resources of the video analytics computing system allocated between the multiple video analytics queries, and execution of the multiple video analytics queries returns respective results for the multiple video analytics queries; and outputting the results for the multiple video analytics queries.

Example 2

The method according to Example 1, further comprising: scheduling the multiple video analytics queries, wherein scheduling the multiple video analytics queries further comprises: allocating the resources of the video analytics computing system between the multiple video analytics queries for the execution of each of the multiple video analytics queries; and selecting multi-dimensional configurations for each of the multiple video analytics queries based on the resources as allocated.

Example 3

The method according to Example 2, wherein scheduling the multiple video analytics queries further comprises: placing the multiple video analytics queries on worker computing devices of the video analytics computing system for the execution of the multiple video analytics queries.

Example 4

The method according to any of Examples 1-3, further comprising: scheduling the multiple video analytics queries jointly based on resource-quality profiles of the multiple video analytics queries and lag tolerances of the multiple video analytics queries.

Example 5

The method according to Example 4, further comprising: generating a resource-quality profile of a particular video analytics query, the resource-quality profile specifies resource demands and result qualities corresponding to candidate multi-dimensional configurations of the particular video analytics query.

Example 6

The method according to Example 5, wherein generating the resource-quality profile of the particular video analytics query further comprises: identifying the candidate multi-dimensional configurations utilizing a greedy local search in a resource-quality space, the candidate multi-dimensional configurations being a subset of potential multi-dimensional configurations, and the candidate multi-dimensional configurations being on a Pareto boundary.

Example 7

The method according to any of Examples 5-6, further comprising: tracking a misestimation of the resource demands specified in the resource-quality profile of the particular video analytics query during execution of the particular video analytics query over time; wherein the particular video analytics query is further scheduled based on the misestimation.

Example 8

The method according to any of Examples 4-7, further comprising periodically adjusting the scheduling of the multiple video analytics queries over time based on changes in resource demands across the multiple video analytics queries and resource capacity of the video analytics computing system.

Example 9

The method according to any of Examples 4-8, further comprising: predicting lags of the multiple video analytics queries over a time horizon; wherein the multiple video analytics queries are further scheduled based on the predicted lags.

Example 10

The method according to any of Examples 1-9, wherein a video analytics query is specified as a graph of transforms applied to at least one of the video streams, and wherein a video frame in the at least one of the video streams is sequentially processed by the transforms such that corresponding outputs of the transforms are passed downstream.

Example 11

The method according to Example 10, wherein: the transforms comprise at least a first transform and a second transform; the first transform is placed on a first worker computing device of the video analytics computing system for execution; and the second transform is placed on a second worker computing device of the video analytics computing system for execution.

Example 12

The method according to any of Examples 1-11, further comprising: allocating the resources of the video analytics computing system between the multiple video analytics queries for the execution of each of the multiple video analytics queries based on: utilities of the multiple video analytics queries, wherein the utilities are based on achieved result quality and lag of the multiple video analytics queries; and a scheduling objective for the video analytics computing system.

Example 13

The method according to Example 12, wherein the resources are allocated utilizing a scheduling heuristic for one of maximizing a minimum utility or maximizing a total utility.

Example 14

The method according to any of Examples 1-13, further comprising: migrating a particular video analytics query between worker computing devices of the video analytics computing system for execution of the particular video analytics query.

Example 15

A video analytics computing system, comprising: at least one processor; and memory that comprises computer-executable instructions that, when executed by the at least one processor, cause the at least one processor to perform acts including: receiving a video analytics query at the video analytics computing system; responsive to receipt of the video analytics query, generating a resource-quality profile of the video analytics query, the resource-quality profile specifies resource demands and result qualities corresponding to candidate multi-dimensional configurations of the video analytics query; and executing the video analytics query on a video stream utilizing resources of the video analytics computing system based on the resource-quality profile.

Example 16

The video analytics computing system according to Example 15, the memory further comprising computer-executable instructions that, when executed by the at least one processor, cause the at least one processor to perform acts including: identifying the candidate multi-dimensional configurations utilizing a greedy local search in a resource-quality space, the candidate multi-dimensional configurations being a subset of potential multi-dimensional configurations, and the candidate multi-dimensional configurations being on a Pareto boundary.

Example 17

The video analytics computing system according to any of Examples 15-16, the memory further comprising computer-executable instructions that, when executed by the at least one processor, cause the at least one processor to perform acts including: scheduling multiple video analytics queries based on resource-quality profiles and lag tolerances of the multiple video analytics query, wherein the multiple video analytics queries comprise the video analytics query, and the resource-quality profiles comprise the resource-quality profile.

Example 18

A video analytics computing system, comprising: at least one processor; and memory that comprises computer-executable instructions that, when executed by the at least one processor, cause the at least one processor to perform acts including: allocating resources of the video analytics computing system between multiple video analytics queries for execution of each of the multiple video analytics queries, the multiple video analytics queries concurrently being executed by the video analytics computing system on video streams as the video streams are streamed to the video analytics computing system from multiple camera; and selecting multi-dimensional configurations for each of the multiple video analytics queries based on the resources as allocated, the multiple video analytics queries being executed utilizing the multi-dimensional configurations.

Example 19

The video analytics computing system according to Example 18, the memory further comprising computer-executable instructions that, when executed by the at least one processor, cause the at least one processor to perform acts including: placing the multiple video analytics queries on worker computing devices of the video analytics computing system for the execution of the multiple video analytics queries.

Example 20

The video analytics computing system according to any of Examples 18-19, wherein the resources of the video analytics computing system are allocated based on resource-quality profiles of the multiple video analytics queries and lag tolerances of the multiple video analytics queries.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:
1. A method of performing video analytics, comprising:
receiving video streams at a video analytics computing system, the video streams being captured by multiple cameras and continuously streamed to the video analytics computing system;
scheduling multiple video analytics queries, wherein scheduling the multiple video analytics queries further comprises:
allocating resources of the video analytics computing system between the multiple video analytics queries for the execution of each of the multiple video analytics queries; and
selecting multi-dimensional configurations for each of the multiple video analytics queries based on the resources as allocated;
executing the multiple video analytics queries on the video streams, the multiple video analytics queries concurrently being executed by the video analytics computing system on the video streams as the video streams are continuously streamed to the video analytics computing system, the multiple video analytics queries being executed utilizing the resources of the video analytics computing system allocated between the multiple video analytics queries, and execution of the multiple video analytics queries returns respective results for the multiple video analytics queries; and
outputting the results for the multiple video analytics queries.
2. The method of claim 1, wherein scheduling the multiple video analytics queries further comprises:

placing the multiple video analytics queries on worker computing devices of the video analytics computing system for the execution of the multiple video analytics queries.

3. The method of claim 1, wherein the multiple video analytics queries are scheduled jointly based on resource-quality profiles of the multiple video analytics queries and lag tolerances of the multiple video analytics queries.

4. The method of claim 3, further comprising:
generating a resource-quality profile of a particular video analytics query, the resource-quality profile specifies resource demands and result qualities corresponding to candidate multi-dimensional configurations of the particular video analytics query.

5. The method of claim 4, wherein generating the resource-quality profile of the particular video analytics query further comprises:
identifying the candidate multi-dimensional configurations utilizing a greedy local search in a resource-quality space, the candidate multi-dimensional configurations being a subset of potential multi-dimensional configurations, and the candidate multi-dimensional configurations being on a Pareto boundary.

6. The method of claim 4, further comprising:
tracking a misestimation of the resource demands specified in the resource-quality profile of the particular video analytics query during execution of the particular video analytics query over time;
wherein the particular video analytics query is further scheduled based on the misestimation.

7. The method of claim 3, further comprising periodically adjusting the scheduling of the multiple video analytics queries over time based on changes in resource demands across the multiple video analytics queries and resource capacity of the video analytics computing system.

8. The method of claim 3, further comprising:
predicting lags of the multiple video analytics queries over a time horizon;
wherein the multiple video analytics queries are further scheduled based on the predicted lags.

9. The method of claim 1, wherein a video analytics query is specified as a graph of transforms applied to at least one of the video streams, and wherein a video frame in the at least one of the video streams is sequentially processed by the transforms such that corresponding outputs of the transforms are passed downstream.

10. The method of claim 9, wherein:
the transforms comprise at least a first transform and a second transform;
the first transform is placed on a first worker computing device of the video analytics computing system for execution; and
the second transform is placed on a second worker computing device of the video analytics computing system for execution.

11. The method of claim 1, wherein the resources of the video analytics computing system are allocated between the multiple video analytics queries for the execution of each of the multiple video analytics queries based on:
utilities of the multiple video analytics queries, wherein the utilities are based on achieved result quality and lag of the multiple video analytics queries; and
a scheduling objective for the video analytics computing system.

12. The method of claim 11, wherein the resources are allocated utilizing a scheduling heuristic for one of maximizing a minimum utility or maximizing a total utility.

13. The method of claim 1, further comprising:
migrating a particular video analytics query between worker computing devices of the video analytics computing system for execution of the particular video analytics query.

14. A video analytics computing system, comprising:
at least one processor; and
memory that comprises computer-executable instructions that, when executed by the at least one processor, cause the at least one processor to perform acts including:
allocating resources of the video analytics computing system between multiple video analytics queries for execution of each of the multiple video analytics queries, the resources of the video analytics computing system are allocated based on resource-quality profiles of the multiple video analytics queries and lag tolerances of the multiple video analytics queries, the multiple video analytics queries concurrently being executed by the video analytics computing system on video streams as the video streams are streamed to the video analytics computing system from multiple camera; and
selecting multi-dimensional configurations for each of the multiple video analytics queries based on the resources as allocated, the multiple video analytics queries being executed utilizing the multi-dimensional configurations.

15. The video analytics computing system of claim 14, the memory further comprising computer-executable instructions that, when executed by the at least one processor, cause the at least one processor to perform acts including:
placing the multiple video analytics queries on worker computing devices of the video analytics computing system for the execution of the multiple video analytics queries.

16. A method of performing video analytics, comprising:
receiving video streams at a video analytics computing system, the video streams being captured by multiple cameras and continuously streamed to the video analytics computing system;
scheduling multiple video analytics queries, wherein the scheduling of the video analytics queries is periodically adjusted over time based on changes in resource demands across the multiple video analytics queries and resource capacity of the video analytics computing system;
executing the multiple video analytics queries on the video streams as scheduled, the multiple video analytics queries concurrently being executed by the video analytics computing system on the video streams as the video streams are continuously streamed to the video analytics computing system, the multiple video analytics queries being executed utilizing resources of the video analytics computing system allocated between the multiple video analytics queries, and execution of the multiple video analytics queries returns respective results for the multiple video analytics queries; and
outputting the results for the multiple video analytics queries.

17. The method of claim 16, wherein scheduling the multiple video analytics queries further comprises:
allocating the resources of the video analytics system between the multiple video analytics queries for the execution of each of the multiple video analytics queries; and selecting multi-dimensional configurations for each of the multiple video analytics queries based on the resources as allocated.

18. The method of claim 16, wherein the resources of the video analytics computing system are allocated based on resource-quality profiles of the multiple video analytics queries and lag tolerances of the multiple video analytics queries.

19. The method of claim 18, wherein a resource-quality profile of a particular video analytics query specifies resource demands and result qualities corresponding to candidate multi-dimensional configurations of the particular video analytics query.

20. The method of claim 16, further comprising:
predicting lags of the multiple video analytics queries over a time horizon;
wherein the multiple video analytics queries are further scheduled based on the predicted lags.

* * * * *